(12) United States Patent
Shishido et al.

(10) Patent No.: US 12,140,760 B2
(45) Date of Patent: Nov. 12, 2024

(54) HEAD-MOUNTED DISPLAY

(71) Applicant: JVCKENWOOD Corporation, Yokohama (JP)

(72) Inventors: Tomoyuki Shishido, Yokohama (JP); Ryouji Hoshi, Yokohama (JP); Kazuki Horikiri, Yokohama (JP); Tetsuji Suzuki, Yokohama (JP); Hideki Aiba, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 485 days.

(21) Appl. No.: 17/674,744

(22) Filed: Feb. 17, 2022

(65) Prior Publication Data
US 2022/0171198 A1 Jun. 2, 2022

Related U.S. Application Data

(63) Continuation of application No. PCT/JP2020/029004, filed on Jul. 29, 2020.

(30) Foreign Application Priority Data

Aug. 21, 2019 (JP) ................. 2019-151038
Nov. 29, 2019 (JP) ................. 2019-216541
Mar. 6, 2020 (JP) ................. 2020-038459

(51) Int. Cl.
*G02B 27/01* (2006.01)
*G02B 27/14* (2006.01)

(52) U.S. Cl.
CPC ..... *G02B 27/0172* (2013.01); *G02B 27/0179* (2013.01); *G02B 27/14* (2013.01); *G02B 2027/0132* (2013.01); *G02B 2027/0187* (2013.01)

(58) Field of Classification Search
CPC ............ G02B 27/0172; G02B 27/0179; G02B 27/14; G02B 2027/0132; G02B 2027/0187; G02B 2027/0114; G09F 9/00; H04N 5/64
USPC .......................................... 359/480
See application file for complete search history.

(56) References Cited

U.S. PATENT DOCUMENTS

| 5,606,458 | A | * | 2/1997 | Fergason | G02B 27/0172 |
| | | | | | 359/633 |
| 11,460,696 | B2 | * | 10/2022 | Jenabzadeh | A61B 5/11 |
| 2016/0349509 | A1 | * | 12/2016 | Lanier | G06F 3/012 |
| 2020/0174262 | A1 | * | 6/2020 | Godar | G06F 3/015 |

(Continued)

FOREIGN PATENT DOCUMENTS

JP  2000249975 A  9/2000

*Primary Examiner* — William R Alexander
(74) *Attorney, Agent, or Firm* — Procopio, Cory, Hargreaves & Savitch LLP

(57) ABSTRACT

A head-mounted display according to an embodiment includes a reflective member configured to reflect display light for forming a display image toward a user, a beam splitter arranged between the reflective member and the user across a space in front of a left eye and a space in front of a right eye, a first divider plate arranged in front of the beam splitter between the space in front of the left eye of the user and the space in front of the right eye, and a second divider plate arranged behind the beam splitter between the space in front of the left eye of the user and the space in front of the right eye, and an end of the first divider plate proximate to the beam splitter is hidden from the user.

13 Claims, 25 Drawing Sheets

(56) References Cited

U.S. PATENT DOCUMENTS

| | | | |
|---|---|---|---|
| 2020/0319457 A1* | 10/2020 | Jenabzadeh | A61B 5/6803 |
| 2020/0359886 A1* | 11/2020 | Azar | G02B 27/0172 |
| 2022/0171197 A1* | 6/2022 | Suzuki | H04N 13/344 |
| 2023/0015732 A1* | 1/2023 | Andall | G06F 3/011 |
| 2023/0061649 A1* | 3/2023 | Armstrong | A63F 13/26 |
| 2024/0028114 A1* | 1/2024 | Cockram | A61B 5/163 |

* cited by examiner

HEAD-MOUNTED DISPLAY

CROSS REFERENCE TO RELATED APPLICATION

This application is based upon and claims the benefit of priority from Japanese patent application No. 2019-151038 filed on Aug. 21, 2019, Japanese patent application No. 2019-216541 filed on Nov. 29, 2019, and Japanese patent application No. 2020-38459 fled on Mar. 6, 2020, the disclosure of which is incorporated herein in its entirety by reference.

BACKGROUND

The present invention relates to a head-mounted display.

Patent Literature 1 (Japanese Unexamined Patent Application Publication No. 2000-249975) discloses a head-mounted display including a concave screen and a half mirror. The half mirror is arranged between the concave screen and a user. Light from a left or right liquid crystal display device is reflected forward by the half mirror. The light that has been reflected by the half mirror is reflected backward by the concave screen. Then, the light that has been reflected by the concave screen passes through the half mirror and an ocular, and enters a left or right eye of the user. The integrally-provided half mirror is used in common for the left and right liquid crystal display devices.

SUMMARY

As described above, the head-mounted display is provided with an optical system for guiding display light from a display element to each of left and right eyes. However, the head-mounted display has a problem that a noise component called crosstalk light where display light from a right-eye display element enters the left eye, for example, occurs, which causes degradation of display quality. Particularly, the effect of crosstalk increases in a case where the optical system is enlarged in order to increase the viewing angle in the left-right direction. The crosstalk means that display light from the left or right display element each enters the eye different from the intended eye. This is described with reference to FIG. 25. FIG. 25 is a top view schematically showing the structure of a display element and an optical system.

A beam splitter 122L and a combiner 121L are arranged in front of the left eye EL. Likewise, a beam splitter 122R and a combiner 121R are arranged in front of the right eye ER. Display light PL11 from a left-eye display element 101L arranged above the beam splitter 122L is reflected by the beam splitter 122L and enters the combiner 121L. The display light PL11 that has been reflected by the combiner 121L passes through the beam splitter 122L and enters the left eye EL.

However, part of the display light PL11 that has been reflected by the combiner 121L enters the right eye ER as crosstalk light PCT. Likewise, part of display light PR11 from a right-eye display element 101R enters the left eye EL as crosstalk light, though not shown in FIG. 25. When part of the display light PL11 or PR11 from the left or right display element enters the eye on the opposite side as crosstalk light PCT, it acts as a noise component of a display image. This reduces contrast and produces a double image or the like, which may cause degradation of display quality.

Patent Literature 1 does not sufficiently reduce crosstalk, and thus has a problem that high display quality cannot be obtained.

A head-mounted display according to an embodiment includes a reflective member arranged in front of a user, and configured to reflect display light for forming a display image toward the user, a beam splitter arranged between the reflective member and the user across a space in front of a left eye of the user and a space in front of a right eye, and configured to reflect the display light to the reflective member and transmit the display light that has been reflected by the reflective member, a first divider plate arranged in front of the beam splitter between the space in front of the left eye and the space in front of the right eye, and a second divider plate arranged behind the beam splitter between the space in front of the left eye and the space in front of the right eye, in which an end of the first divider plate proximate to the beam splitter is hidden from the user.

DETAILED DESCRIPTION

Specific embodiments of the present invention are described hereinafter in detail with reference to the drawings. The present disclosure, however, is not limited to the below-descried embodiments. The following description and the attached drawings are appropriately simplified to clarify the explanation.

First Embodiment

Figure 1:
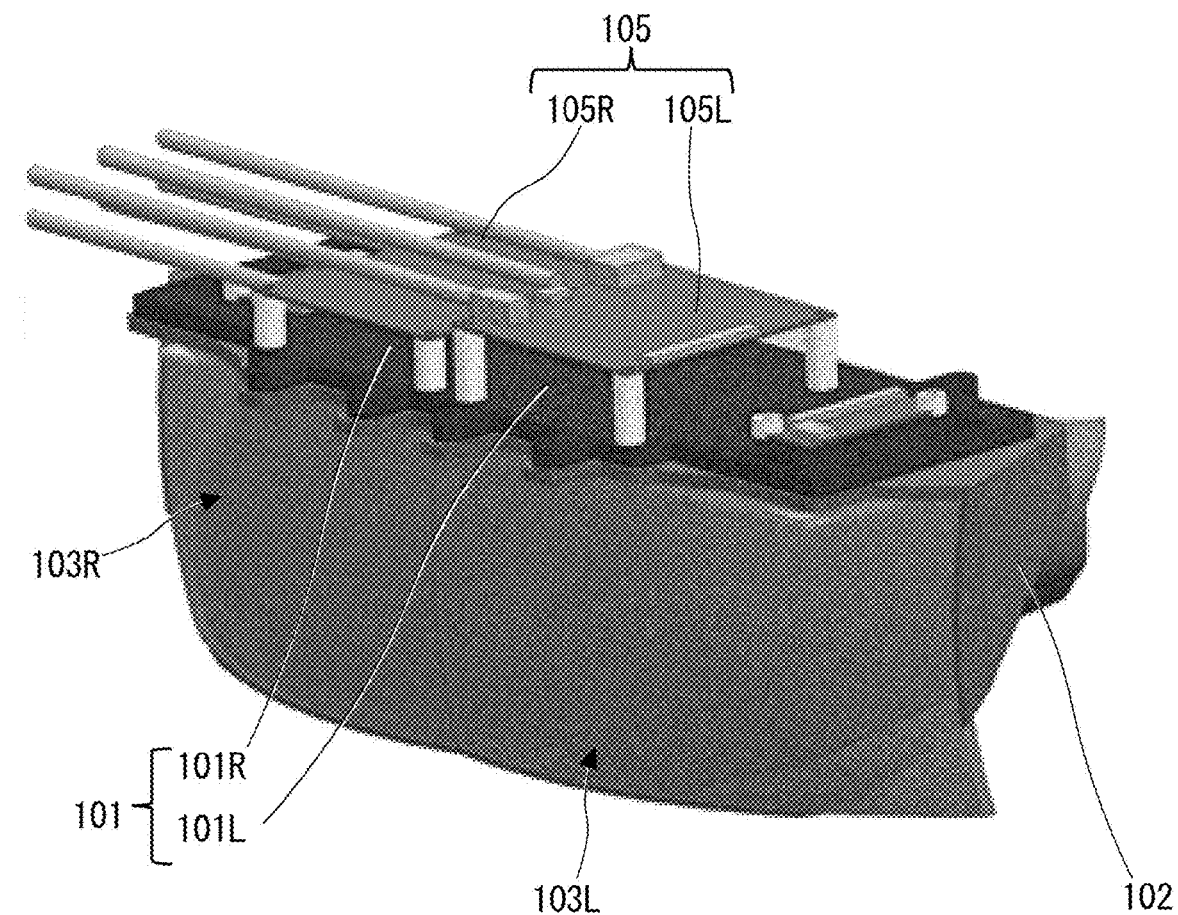
FIG. 1 is a view showing a part of the structure of a head-mounted display according to an embodiment.
Figure 1:
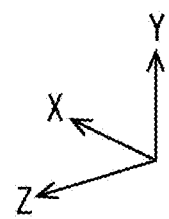
Figure 2:
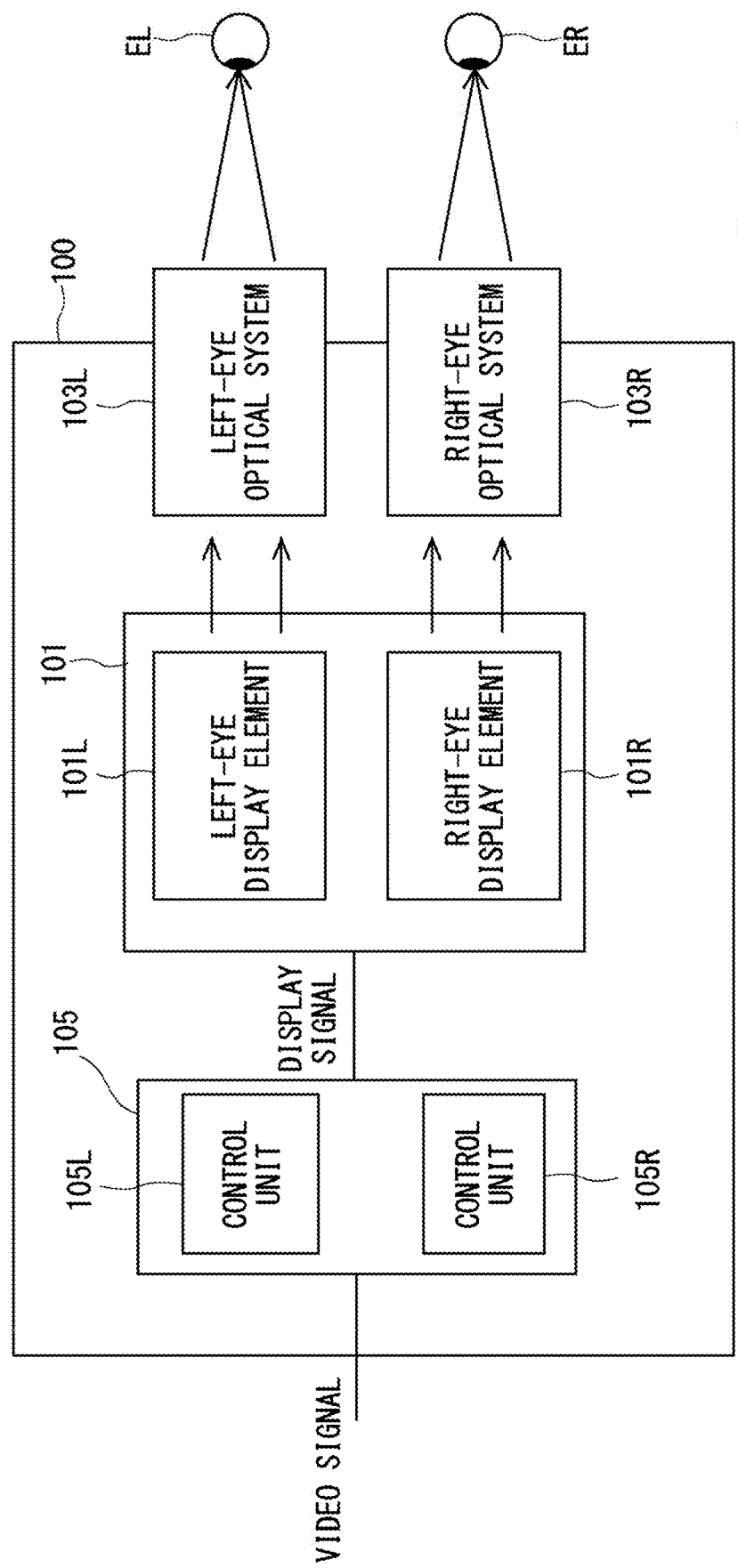
FIG. 2 is a view showing functional blocks of the head-mounted display according to the embodiment.

A head-mounted display and a display method of the same according to an embodiment are described hereinafter with reference to the drawings. FIG. 1 is a perspective view schematically showing a part of a structure of a head-mounted display 100. FIG. 2 is a view showing some of functional blocks of the head-mounted display 100. FIGS. 1 and 2 mainly show a structure related to image display of the head-mounted display 100. FIG. 1 shows the internal structure of the head-mounted display 100, and the elements shown in FIG. 1 may be covered with a cover or the like in practice.

The head-mounted display 100 is applicable to various purposes, such as game, entertainment, industrial, medical, and flight simulation purposes. The head-mounted display 100 may be a VR (Virtual Reality) head-mounted display, an AR (Augmented Reality) head-mounted display, or an MR (Mixed Reality) head-mounted display, for example. Note that the head-mounted display 100 is an optical see-through head-mounted display used for AR or MR in this embodiment, but may be a non-transmissive head-mounted display.

To clarify the explanation, an XYZ three-dimensional Cartesian coordinate system is used in the following description. As seen from a user, the front-back direction (depth direction) is Z direction, the left-right direction (horizontal direction) is X direction, and the up-down direction (vertical direction) is Y direction. The front direction is +Z direction, the back direction is –Z direction, the right direction is +X direction, the left direction is –X direction, the up direction is +Y direction, and the down direction is –Y direction.

The user, which is not shown, is wearing the head-mounted display 100. The head-mounted display 100 includes a display element unit 101, a frame 102, a left-eye optical system 103L, a right-eye optical system 103R, and a control unit 105. The control unit 105 includes a control unit 105L and a control unit 105R.

The frame 102 has goggles or glasses shape, and it is worn on the head of the user by a head band, which is not shown, or the like. The display element unit 101, the left-eye optical system 103L, the right-eye optical system 103R, the control unit 105L, and the control unit 105R are mounted on the frame 102. Note that, although the binocular head-mounted display 100 is shown in FIG. 1, the head-mounted display may be a glasses-shaped non-immersive head-mounted display.

The display element unit 101 includes a left-eye display element 101L and a right-eye display element 101R. The left-eye display element 101L generates a display image for a left eye. The right-eye display element 101R generates a display image for a right eye. Each of the left-eye display element 101L and the right-eye display element 101R includes a flat-panel display such as a liquid crystal monitor or an organic EL (Electro-Luminescence) monitor. The left-eye display element 101L and the right-eye display element 101R may be curve-shaped displays. Each of the left-eye display element 101L and the right-eye display element 101R includes a plurality of pixels arranged in an array. The array arrangement is not limited to two-dimensional matrix arrangement, and it may be PenTile arrangement or the like. The left-eye display element 101L is arranged on the left side (–X side) of the right-eye display element 101R.

The control unit 105 is provided above (on the +Y side) the display element unit 101. A video signal, a control signal, and power from the outside are supplied to the control unit 105. For example, a video signal and the like are input to the control unit 105 by wired connection such as HDMI (registered trademark) or wireless connection such as WiFi (registered trademark) or BlueTooth (registered trademark). The head-mounted display 100 may include a video generation unit (not shown) that generates a video signal, and a video signal or the like generated by the video generation unit may be input to the control unit 105.

The control unit 105L and the control unit 105R include hardware resources such as a CPU (Central Processing Unit), a memory and the like, and operates according to a computer program stored in the memory. Further, each of the control unit 105L and the control unit 105R includes a display driving circuit or the like. The control unit 105L generates a display signal of a left-eye image on the basis of a video signal, a control signal and the like and outputs it to the left-eye display element 101L. The left-eye display element 101L thereby outputs display light for displaying the left-eye image. The control unit 105R generates a display signal of a right-eye image on the basis of a video signal, a control signal and the like and outputs it to the right-eye display element 101R. The right-eye display element 101R thereby outputs display light for displaying the right-eye image. In this manner, the control unit 105 outputs display signals to the display element unit 101.

Note that the display element unit 101 does not necessarily have the structure in which the left-eye display element 101L and the right-eye display element 101R are separate display elements, and it may have a single display element. The single display element may generate a display image for a left eye and a display image for a right eye. In this case, the display element unit 101 generates a left-eye image by using a part on one side of the display area of the display and generates a right-eye image by using a part on the other side of the display area of the display.

Some or all of the display element unit 101, the control unit 105 and the like are not necessarily fixed to the frame 102, and they may be mounted detachable from the frame 102. For example, the display element unit 101, the control unit 105 and the like may be implemented by mounting a smartphone or a tablet computer on the frame 102. In this case, an application program (app) that generates display images for the head-mounted display is previously installed into the smartphone or the like.

The left-eye optical system 103L guides the display light that is output from the left-eye display element 101L to the left eye EL of the user as a left-eye image. The right-eye optical system 103R guides the display light that is output from the right-eye display element 101R to the right eye ER of the user as a right-eye image. The left-eye optical system 103L is arranged on the left side (−X side) of the right-eye optical system 103R. The left-eye optical system 103L is arranged in front (+Z direction) of the left eye EL of the user. The right-eye optical system 103R is arranged in front (+Z direction) of the right eye ER of the user. The user is able to see a virtual image of a display image generated by the display element unit 101 in the front (in the +Z direction).

As described above, the head-mounted display 100 according to this embodiment may either be a semitransparent or non-transmissive head-mounted display. Note that the description herein is provided assuming that the head-mounted display 100 is a semitransparent head-mounted display. Thus, the left-eye optical system 103L and the right-eye optical system 103R include a combiner, which is described later. In the semitransparent head-mounted display 100, display light from the display element unit 101 and outside light enter the left eye EL and the right eye ER. Thus, the user is able to see a superimposed image on which a display image is superimposed on a view in the front (in the +Z direction).

Figure 3:
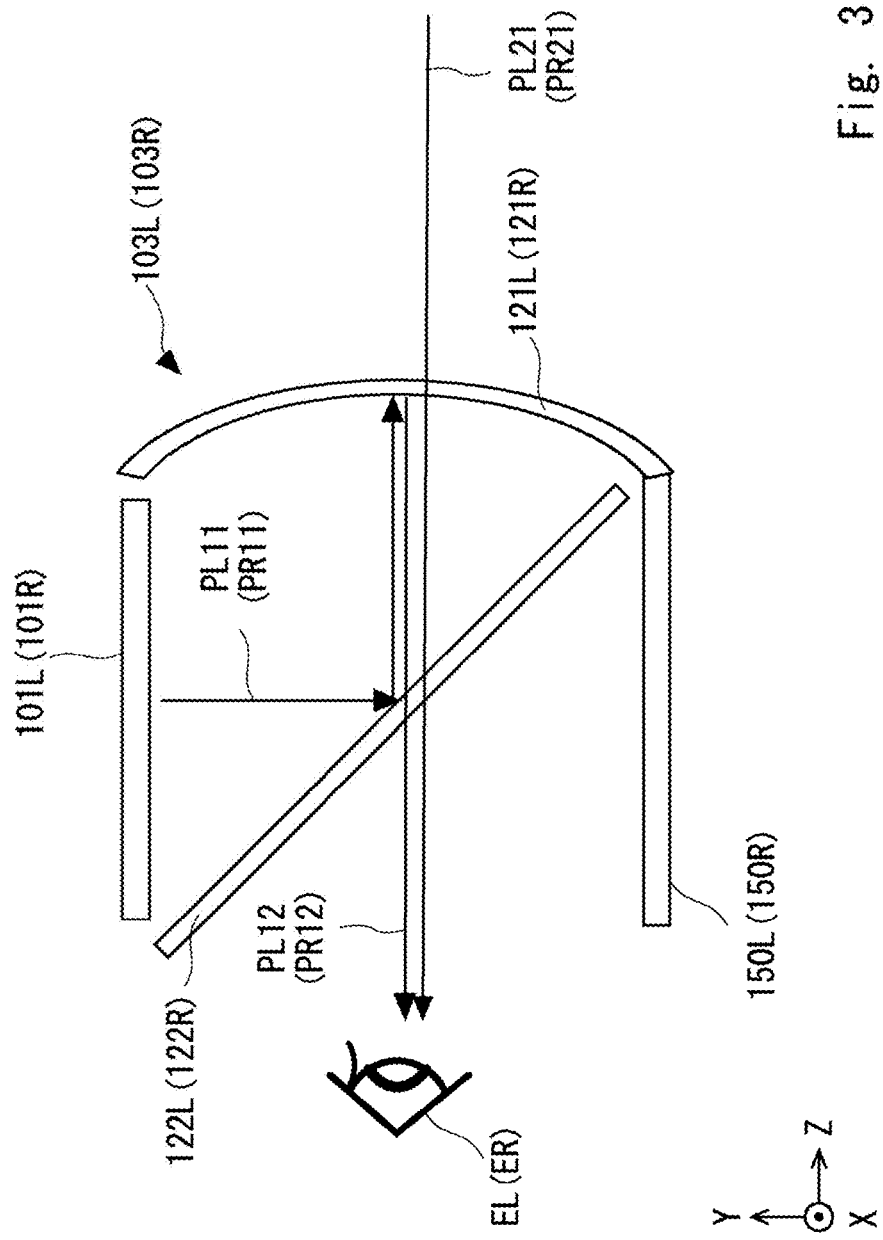
FIG. 3 is a view for describing display light and outside light in an optical system of a head-mounted display.

An example of the left-eye optical system 103L and the right-eye optical system 103R (which are collectively referred to simply as an optical system below) is described hereinafter. FIG. 3 is a side view schematically showing the optical system. Note that the left-eye optical system 103L and the right-eye optical system 103R have the same structure, and therefore the left-eye optical system 103L is mainly described in the following description.

The left-eye optical system 103L includes the combiner 121L, a beam splitter 122, and a light shielding part 150L. The right-eye optical system 103R includes a combiner 121R, the beam splitter 122, and a light shielding part 150R. The combiners 121L, 121R, the beam splitter 122, and the light shielding parts 150L, 150R are fixed to the frame 102 shown in FIG. 1.

The left-eye optical system 103L and the right-eye optical system 103R have the beam splitter 122 in common. In other words, the single beam splitter 122 is shared by the left-eye optical system 103L and the right-eye optical system 103R.

The combiner 121L is a concave mirror, and the beam splitter 122 is a plane mirror. The combiner 121L and the beam splitter 122 are beam splitters such as half-mirrors, and reflect part of incident light and transmit part of incident light. When it is assumed that the percentage of reflection and the percentage of transmission in the combiner 121L are equal, the combiner 121L transmits approximately half of the amount of incident light, and reflects the remaining half. Likewise, when it is assumed that the percentage of reflection and the percentage of transmission in the beam splitter 122 are equal, the beam splitter 122 transmits approximately half of the amount of incident light, and reflects the remaining half. The combiner 121L and the beam splitter 122 may increase the percentage of reflection and decrease the percentage of transmission, or may decrease the percentage of reflection and increase the percentage of transmission.

The combiner 121L and the beam splitter 122 are arranged in front (+Z direction) of the user's left eye EL. Further, the combiner 121L is arranged in front (+Z direction) of the beam splitter 122.

The left-eye display element 101L is arranged above (in the +Y direction) the beam splitter 122. The left-eye display element 101L outputs the display light PL11 for forming a display image. Thus, the left-eye display element 101L is arranged diagonally above in front of the left eye EL.

The light shielding part 150L is arranged below (in the −Y direction) the beam splitter 122. Thus, the light shielding part 150L is arranged diagonally below in front of the left eye EL. The light shielding part 150L is provided to shield a field of vision in the diagonally lower front. The light shielding part 150L is formed of a black material or the like that absorbs light. A lower window for viewing the diagonally lower front may be provided instead of the light shielding part 150L.

The display light PL11 from the left-eye display element 101L is described hereinafter. The display surface of the left-eye display element 101L faces downward (in the −Y direction). Thus, the display light PL11 from the left-eye display element 101L is output downward (in the −Y direction). The beam splitter 122 is arranged at an angle below (in the −Y direction) the left-eye display element 101L. The display light PL11 from the left-eye display element 101L enters the beam splitter 122. The beam splitter 122 reflects part of the display light PL11. The remaining part of the display light PL11 that has passed through the beam splitter 122 is absorbed by the light shielding part 150L.

The display light PL11 that has been reflected by the beam splitter 122 is reflected forward (in the +Z direction). Then, the display light PL11 enters the combiner 121L. The combiner 121L reflects part of the display light PL11 backward (in the −Z direction). The display light PL11 that has been reflected by the combiner 121L is referred to as display light PL12. Further, the combiner 121L is a concave mirror, and reflects the display light PL11 so as to focus the display light PL12 toward the left eye EL. The display light PL12 that has been reflected by the combiner 121L enters the beam splitter 122. The beam splitter 122 transmits part of the display light PL12.

The display light PL12 that has passed through the beam splitter 122 enters the left eye EL. In this manner, the left-eye optical system 103L guides the display light PL11 from the left-eye display element 101L to the user's left eye EL. The optical system can display the virtual image in front (in the +Z direction) of the user. Further, since a concave mirror is used as the combiner 121L, the display image is displayed in a larger scale.

The outside light PL21 from the front (+Z direction) of the user is described hereinafter. Part of the outside light PL21 passes through the combiner 121L. The outside light PL21 that has passed through the combiner 121L enters the beam splitter 122. The beam splitter 122 transmits part of the outside light PL21. The outside light PL21 that has passed through the beam splitter 122 enters the left eye EL.

Since the head-mounted display 100 is semitransparent, the combiner 121L combines the outside light PL21 from the front (+Z direction) and the display light PL11 from the left-eye display element 101L. By arranging the combiner 121L in front (in the +Z direction) of the user, the head-mounted display 100 functions as an optical see-through display. A display image is superimposed on a view in front (in the +Z direction) of the user. The user is thereby able to see a view on which the display image is superimposed.

The right-eye optical system 103R is the same as the left-eye optical system 103L. Further, the left-eye optical system 103L and the right-eye optical system 103R have the beam splitter 122 in common. Thus, the integrally-formed single beam splitter 122 is arranged on optical paths of the display light PL11 and PL12 in the left-eye optical system 103L and the display light PR11 and PR12 in the right-eye optical system 103R.

Since the left-eye optical system 103L and the right-eye optical system 103R share the beam splitter 122, alignment adjustment can be performed easily. In other words, in a case where the left-eye optical system 103L and the right-eye optical system 103R use separate beam splitters, highlyaccurate alignment adjustment is required. The structure in which the left-eye optical system 103L and the right-eye optical system 103R are provided with the beam splitters 122 separately is described hereinafter with reference to FIG. 4.

Figure 4:
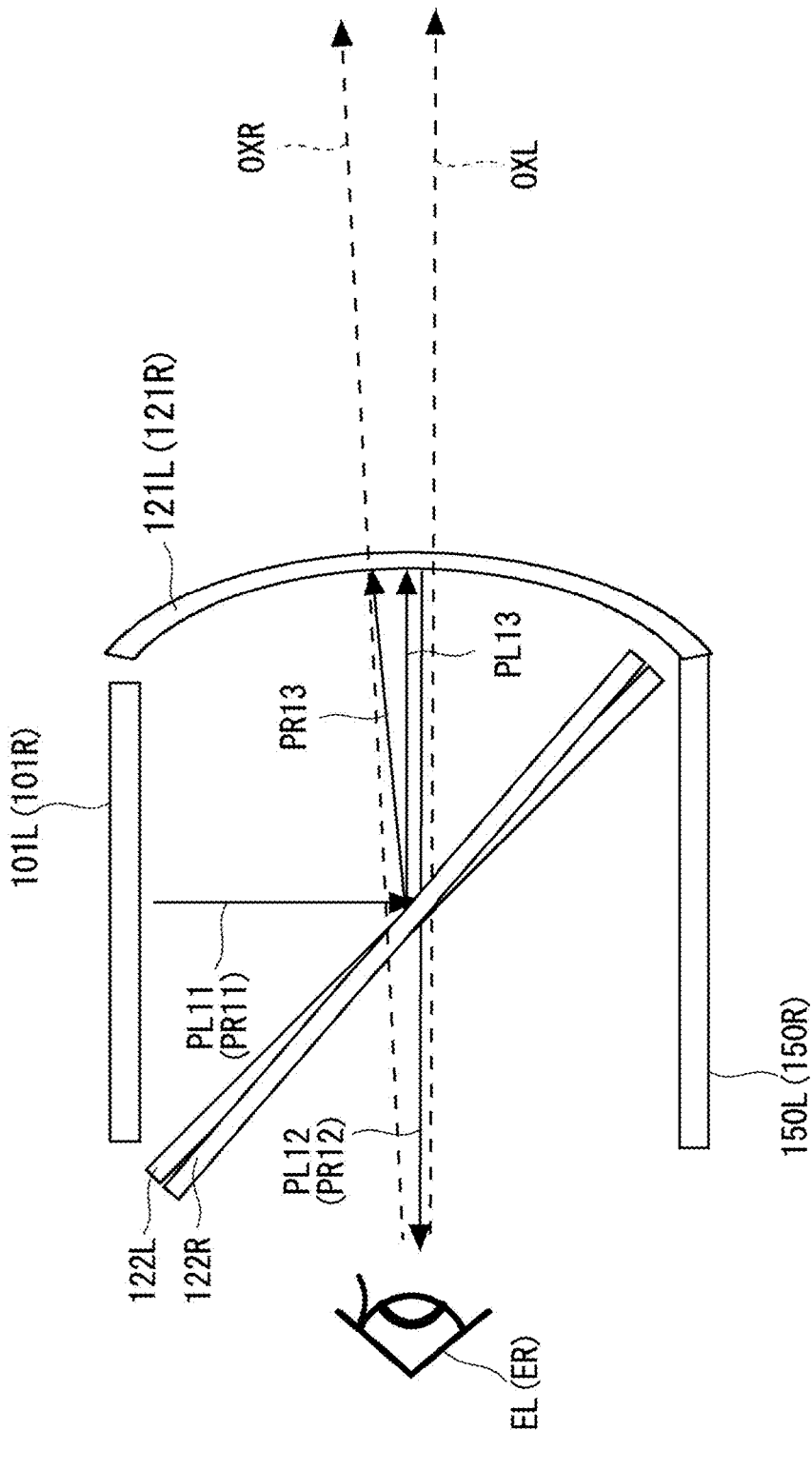
FIG. 4 is a side view for describing the structure in which left and right optical systems are provided with beam splitters, respectively.

In FIG. 4, the left-eye optical system 103L and the right-eye optical system 103R are provided with the beam splitters 122 separately. The beam splitter 122 in the left-eye optical system 103L is shown as the beam splitter 122L, and the beam splitter 122 in the right-eye optical system 103R is shown as the beam splitter 122R. The beam splitter 122L and the beam splitter 122R are different optical components. In a case of installing the beam splitter 122L and the beam splitter 122R respectively on the frame 102 or the like, an installation error may occur.

FIG. 4 shows a state in which the installation error or the like has misaligned the angles at which the beam splitter 122L and the beam splitter 122R are located. In the case where the angles at which the beam splitter 122L and the beam splitter 122R are located are different, the directions in which the display light PL11 and the display light PR11 are reflected are misaligned. Herein, the display light PL11 that has been reflected by the beam splitter 122L toward the combiner 121L is referred to as display light PL13, and the display light PR11 that has been reflected by the beam splitter 122R toward the combiner 121R is referred to as display light PR13. Because of the installation error or the like, the direction in which the display light PL13 propagates is not in parallel to the direction in which the display light PR13 propagates.

In this case, a left-eye display image and a right-eye display image seen by the user are misaligned. In FIG. 4, the beam splitter 122L and the beam splitter 122R are different in angle around the X-axis. FIG. 4 shows the direction of the center of the left-eye display image seen from the left eye EL as a central axis OXL, and the direction of the center of the right-eye display image seen from the right eye ER as a central axis OXR. If the central axis OXL and the central axis OXR are not in parallel because of the installation error, the left-eye display image and the right-eye display image are seen in a manner misaligned in the up-down direction (the Y direction). The user sees the right-eye display image above (in the +Y direction) the left-eye display image.

Particularly, in the structure in which the combiners 121L and 121R are used to achieve an optical see-through display, the user is able to see a view of the outside world or an object through the combiners 121L and 121R. In this case, when the user focuses on the outside world, the left and right display images are brought into a misaligned state and seen by the user like a double image. In a case of making the frame 102 and the beam splitter 122 of resin in order to reduce the weight and cost of the head-mounted display 100, it is difficult to subject the two beam splitters 122L and 122R to alignment adjustment with high accuracy.

In contrast, in FIG. 3, the common beam splitter 122 is used for the left-eye optical system 103L and the right-eye optical system 103R. Thus, an installation error of the beam splitter 122 does not occur. Display images to be seen by the user are prevented from being misaligned, which allows high display quality to be obtained. Since alignment adjustment can be performed with high accuracy even when the beam splitter 122 is made of resin, the head-mounted display 100 can be reduced in weight.

Figure 5:
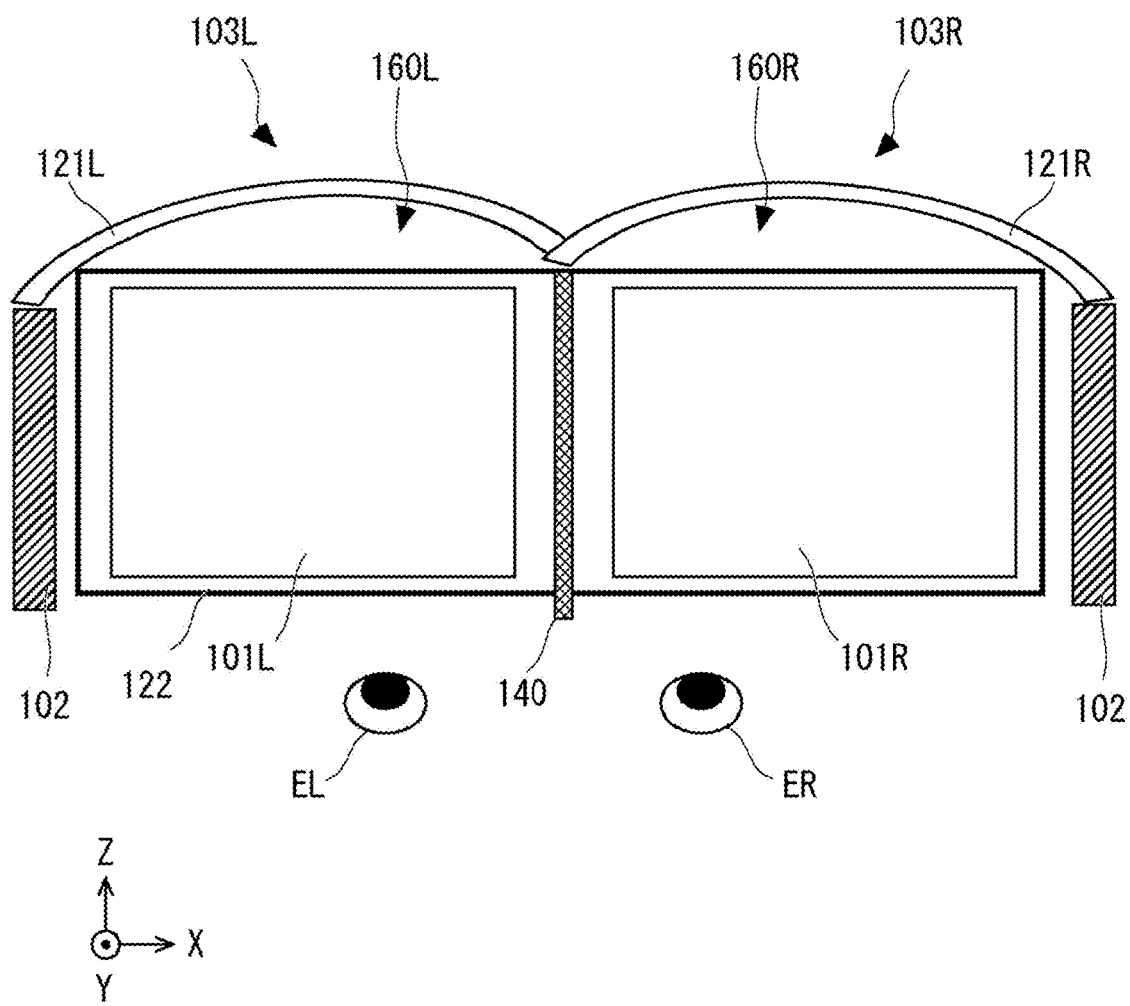
FIG. 5 is a top view schematically showing the structure of an optical system of a head-mounted display according to a first embodiment.
Figure 6:
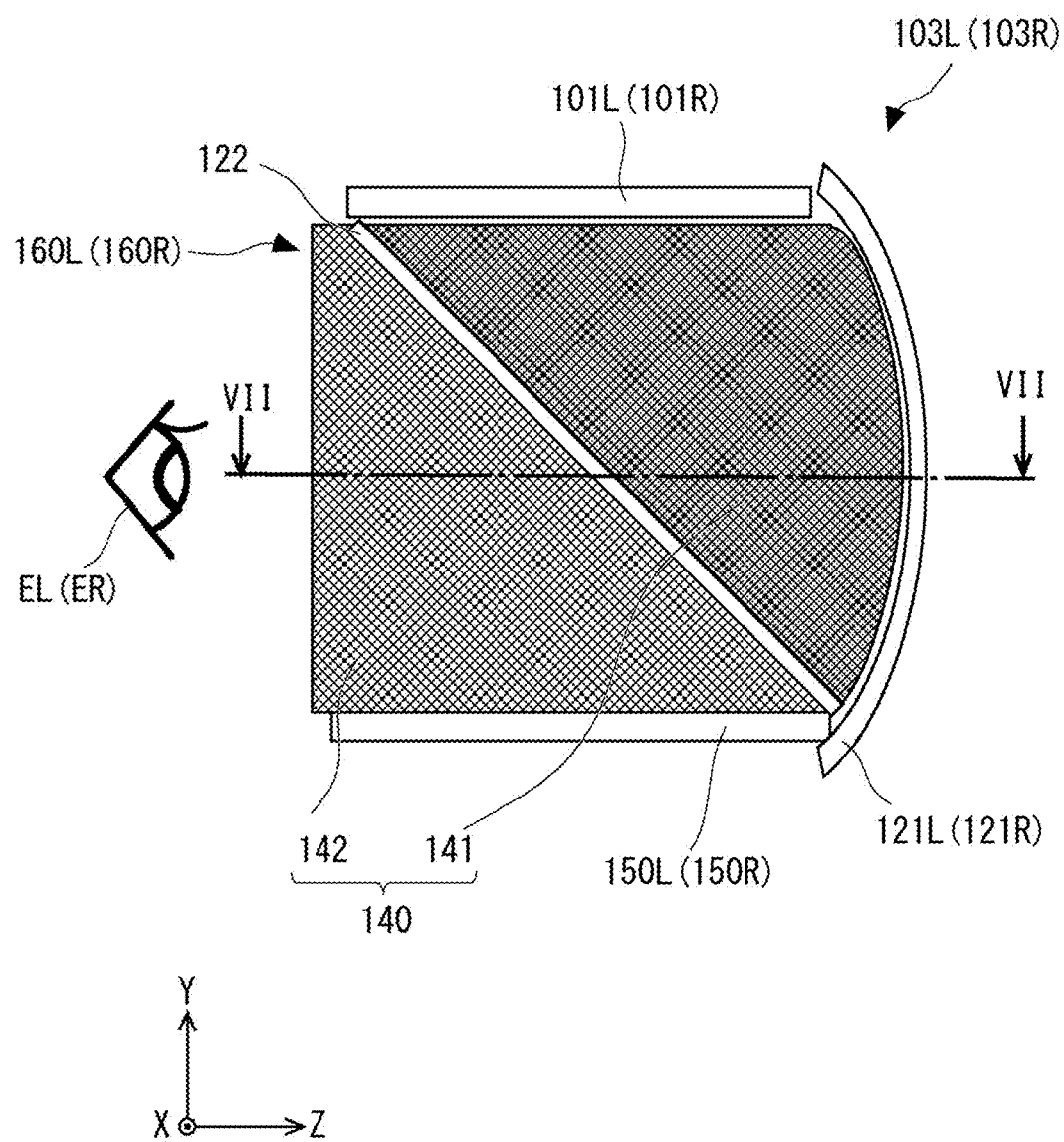
FIG. 6 is a side view schematically showing the structure of the optical system of the head-mounted display according to the first embodiment.

The structure of reducing crosstalk is described hereinafter with reference to FIGS. 5 and 6. FIG. 5 is a top view schematically showing the optical system, and FIG. 6 is a side sectional view. As shown in FIGS. 5 and 6, the divider part 140 is provided between the left-eye optical system 103L and the right-eye optical system 103R. The beam splitter 122 is arranged across a left front space 160L and a right front space 160R.

The divider part 140 is arranged between a space in front (in the +Z direction) of the left eye EL (which is referred to as the left front space 160L below) and a space in front (in the +Z direction) of the right eye ER (which is referred to as the right front space 160R below). The left front space 160L and the right front space 160R are divided by the divider part 140. The divider part 140 defines the boundary between the left front space 160L and the right front space 160R in the X direction.

Note that the left front space 160L is a space defined by the combiner 121L, the left-eye display element 101L, the light shielding part 150L, the divider part 140, the frame 102 (see FIG. 1 together), and the user's face. Thus, the front side (in the +Z direction) of the left front space 160L faces the combiner 121L, and the rear side (in the −Z direction) faces the user's face. The upper side (in the +Y direction) of the left front space 160L faces the left-eye display element 101L, and the lower side (in the −Y direction) faces the light shielding part 150L. The right side (in the +X direction) of the left front space 160L faces the divider part 140, and the left side (in the −X direction) faces the frame 102.

Likewise, the right front space 160R is a space defined by the combiner 121R, the right-eye display element 101R, the light shielding part 150R, the divider part 140, the frame 102 (see FIG. 1 together), and the user's face. Thus, the front side (in the +Z direction) of the right front space 160R faces the combiner 121R, and the rear side (in the −Z direction) faces the user's face. The upper side (in the +Y direction) of the right front space 160R faces the right-eye display element 101R, and the lower side (in the −Y direction) faces the light shielding part 150R. The right side (in the +X direction) of the right front space 160R faces the frame 102, and the left side (in the −X direction) faces the divider part 140.

As shown in FIG. 6, the divider part 140 includes a divider plate 141 and a divider plate 142. The divider part 140 is composed of the two divider plates 141 and 142. The divider plate 141 is arranged in front (in the +Z direction) of the beam splitter 122. The divider plate 142 is arranged behind (in the −Z direction) the beam splitter 122. The divider plate 141 may be in contact with the beam splitter 122, or may not be in contact with the beam splitter 122. The divider plate 142 may be in contact with the beam splitter 122, or may not be in contact with the beam splitter 122. The divider plate 141 and the divider plate 142 are arranged apart from each other at least by the thickness of the beam splitter 122.

The divider plate 141 and the divider plate 142 are diffuse reflection plates, each of which diffusely reflects visible light. Diffuse reflection means a diffuse reflection component of light reflection excluding specular reflection. The divider plate 141 and the divider plate 142 diffusely reflect incident outside light and display light in various directions. Note that the divider part 140 may not divide the left front space 160L and the right front space 160R completely. In other words, the left front space 160L and the right front space 160R may be connected partially.

Figure 25:
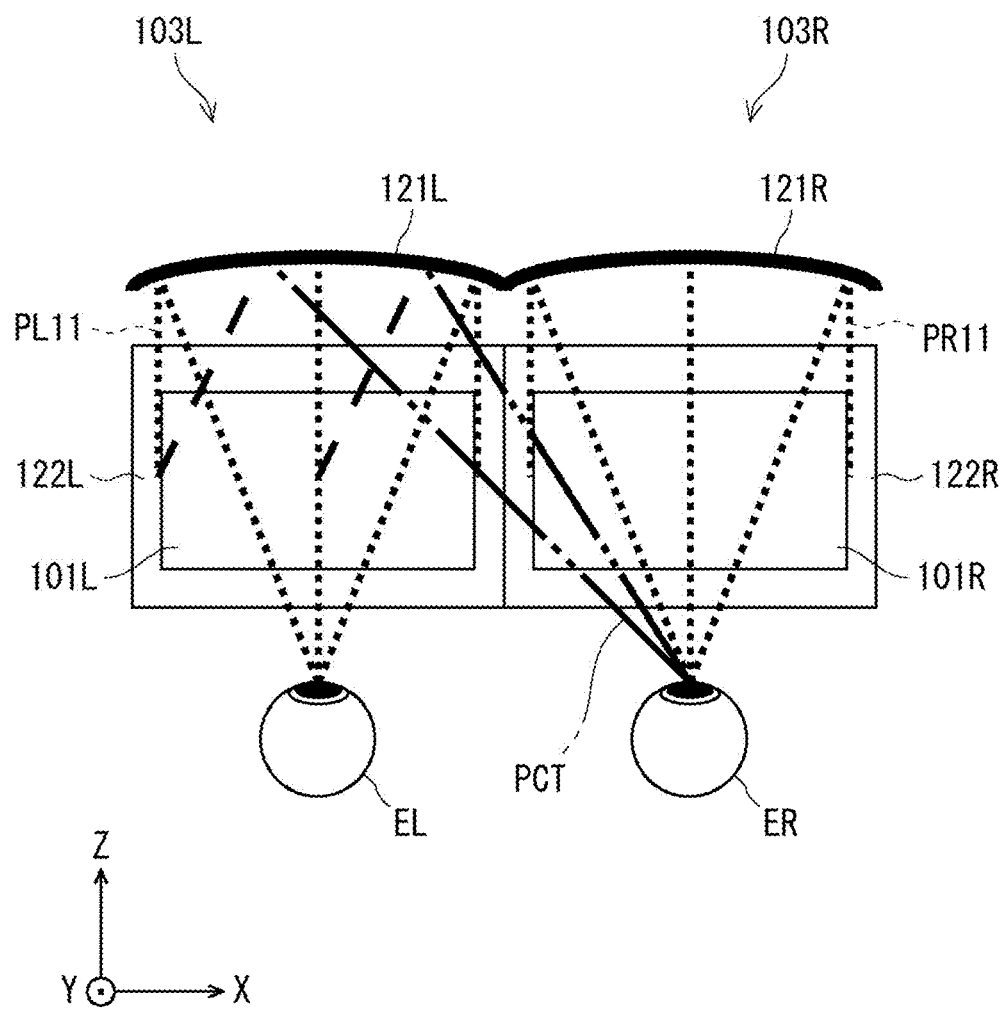
FIG. 25 is a view for describing crosstalk of display light.

The divider part 140 blocks the display light PL11 and PL12 from the left-eye display element 101L from entering the right eye ER. The divider part 140 also blocks the display light PR11 from the right-eye display element 101R and the display light PR12 which is the display light PR11 that has been reflected by the combiner 121R from entering the left eye EL. In other words, the divider part 140 blocks the crosstalk light PCT shown in FIG. 25. This reduces crosstalk, and improves display quality.

Further, since the divider plate 141 and the divider plate 142 of the divider part 140 are diffuse reflection plates, part of light that has entered the divider part 140 reaches the left eye EL or the right eye ER. For example, part of the outside light PL21 that has passed through the combiner 121L is diffusely reflected by the divider part 140 and enters the left eye EL. Further, part of the display light PL11 and PL12 from the left-eye display element 101L is diffusely reflected by the divider part 140 and enters the left eye EL. Part of the outside light PR21 that has passed through the combiner 121R is diffusely reflected by the divider part 140 and enters the right eye ER. Further, part of the display light PR11 and PR12 from the right-eye display element 101R is diffusely reflected by the divider part 140 and enters the right eye ER.

Thus, this embodiment prevents the divider part 140 from being seen as a black shadow by the user, as compared with a case in which the divider part 140 is a non-diffuse reflection plate. In other words, the divider part 140 diffusely reflects part of light in such a way that the divider part 140 does not stand out. Note that the non-diffuse reflection plate refers to a resin plate colored black, for example.

Diffuse reflectance of the divider part 140 is adjusted in such a way that the divider part 140 does not become excessively bright or excessively dark to stand out. The diffuse reflectance refers to the percentage of the amount of diffusely reflected light in the amount of incident light, and represents color brightness. The diffuse reflectance is adjusted by a color that colors the divider part 140 and treatment to be performed on the surface of the divider part 140. The diffuse reflectance of the divider part 140 preferably falls within a range that is not close to 0% at which the divider part 140 becomes excessively bright and that is not close to 100% at which the divider part 140 becomes excessively dark. This allows the user to naturally see the display image, which improves display quality.

In order that the divider part 140 has appropriate diffuse reflectance so as not to stand out, a resin plate colored gray or the like is used for the divider part 140, for example. Gray refers to colors except white whose mixing ratio is 100% white and black whose mixing ratio is 100% black among achromatic colors which are mixed colors of white and black. Gray also includes a color whose mixing ratio is 1% white and 99% black, and a color whose mixing ratio is 99% white and 1% black. In other words, the divider part 140 is colored by a color which is neither white nor black.

Alternatively, by forming the divider part 140 with diffuse reflection treatment performed on its surface, the divider part 140 has appropriate diffuse reflectance so as not to stand out. The diffuse reflection treatment refers to rubbing a resin surface with sandpaper or the like to roughen the resin surface so as to have fine irregularities, for example. Herein, the surface of the divider part 140 refers to the surface that faces the left front space 160L and the surface that faces the right front space 160R. In other words, the surfaces of the divider plate 141 and the divider plate 142 refer to the surface that faces the left front space 160L and the surface that faces the right front space 160R. The surfaces of the divider plate 141 and the divider plate 142 are subjected to diffuse reflection treatment.

Irrespective of brightness or darkness of the divider part 140, the divider part 140 may have substantially the same color as the user's skin color such as the user's skin tone so as not to stand out. The user's skin color indicates all colors that may generally be recognized as skin tones, and can be changed as appropriate according to the skin tone of a race.

The user's skin color may be a color that falls within a range in which $0.375 \leq x \leq 0.400$ and $0.340 \leq y \leq 0.360$ held on the CIE chromaticity diagram, for example. The skin color in a case where the user is the Caucasoid race may be a color that falls within a range in which $0.375 \leq x \leq 0.385$ and $0.340 \leq y \leq 0.345$ held on the CIE chromaticity diagram. The skin color in a case where the user is the Mongoloid or Negroid race may be a color that falls within a range in which $0.390 \leq x \leq 0.400$ and $0.350 \leq y \leq 0.360$ held on the CIE chromaticity diagram. When the divider part 140 has the same type of color as the skin color, the divider part 140 blends in with the nose and is seen like part of the nose, which improves display quality.

Since the divider part 140 is the diffuse reflection plate, the user is able to see the display image without the divider part 140 being emphasized. This increases display quality. Further, since display light that has entered the divider part 140 is diffusely reflected, part of the display image is prevented from being formed by display light that has been reflected by the divider part 140. This increases display quality.

Note that the divider plate 141 and the divider plate 142 are formed of a thin plate whose thickness direction is the left-right direction (the X direction). The shapes of the divider plate 141 and the divider plate 142 on the Y-Z plane are determined according to the shapes of the left front space 160L and the right front space 160R. Note that an end side of a diffuse reflection plate to be the divider plate 141 is shaped to conform to the display element unit 101, the combiners 121L and 121R, and the beam splitter 122. An end side of a diffuse reflection plate to be the divider plate 142 is shaped to conform to the beam splitter 122 and the light shielding parts 150L and 150R. As shown in FIG. 6, an end side of the divider plate 141 in the front (in the +Z direction) is formed along the curves of the combiners 121L and 121R. In other words, the end side of the divider plate 141 in the front (in the +Z direction) is formed as an arc on the Y-Z plane. This allows the left front space 160L and the right front space 160R to be divided properly, which reduces crosstalk effectively.

Figure 7:
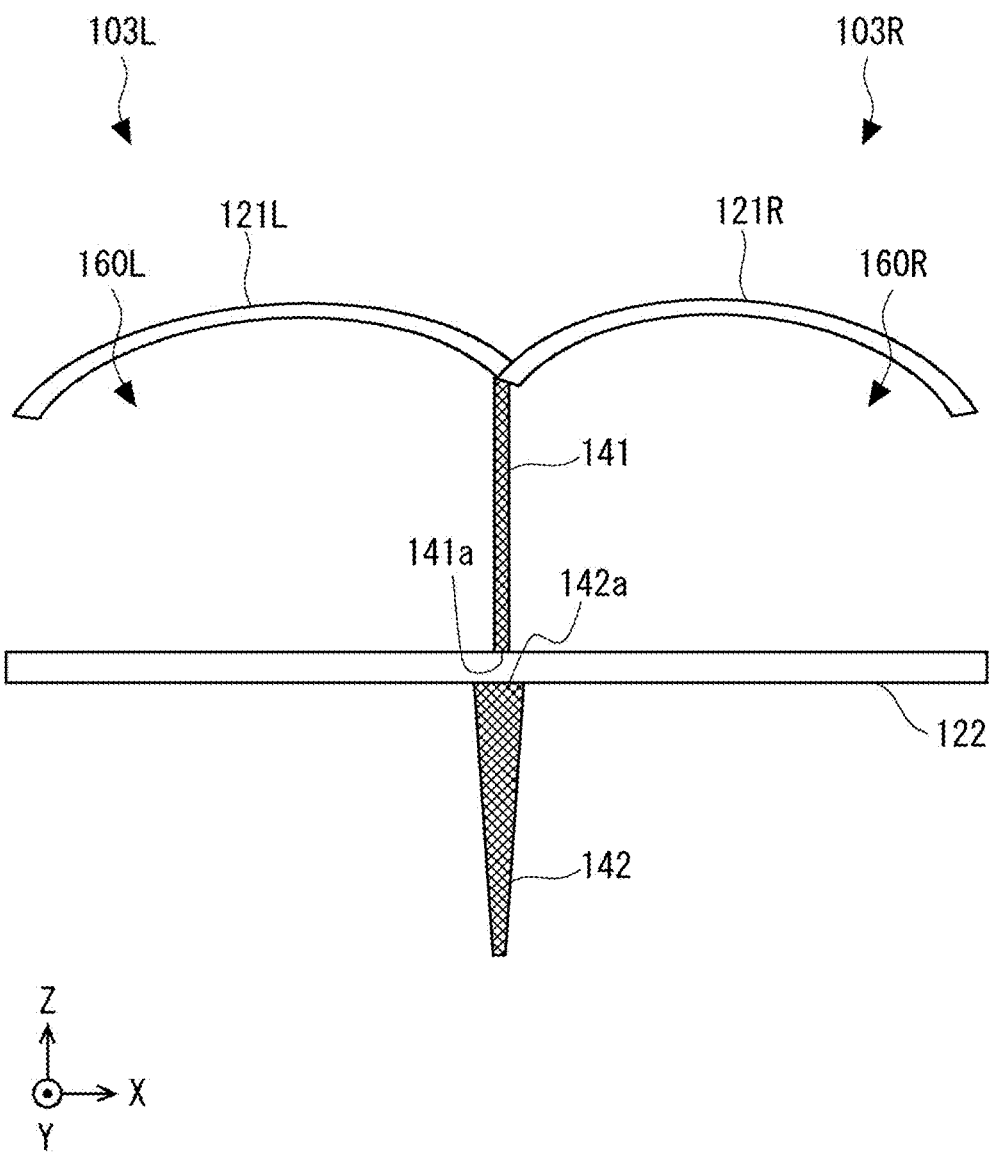
FIG. 7 is a view showing an example of divider plates 141 and 142.

The shapes of the divider plate 141 and the divider plate 142 are described hereinafter in detail. FIG. 7 is a view schematically showing the structure at the section VII-VII in FIG. 6. The sizes of the divider plates 141 and 142 in the X direction are described hereinafter as being the thicknesses of the divider plates 141 and 142.

The divider plate 141 has a constant thickness. In other words, the size of the divider plate 141 in the X direction is constant at any position in the Z direction. Note that an end of the divider plate 141 proximate to the beam splitter 122 is referred to as an end 141a.

The divider plate 142 has a tapered shape, which is made thicker from a −Z side end toward the +Z direction. In other words, the size of the divider plate 142 in the X direction varies according to the position in the Z direction. When an end of the divider plate 142 proximate to the beam splitter 122 is referred to as an end 142a, the thickness of the end 142a is greater than the thickness of the end 141a. Such a structure prevents the end 141a of the divider plate 141 from looking bright. This allows higher display quality to be obtained.

Figure 8:
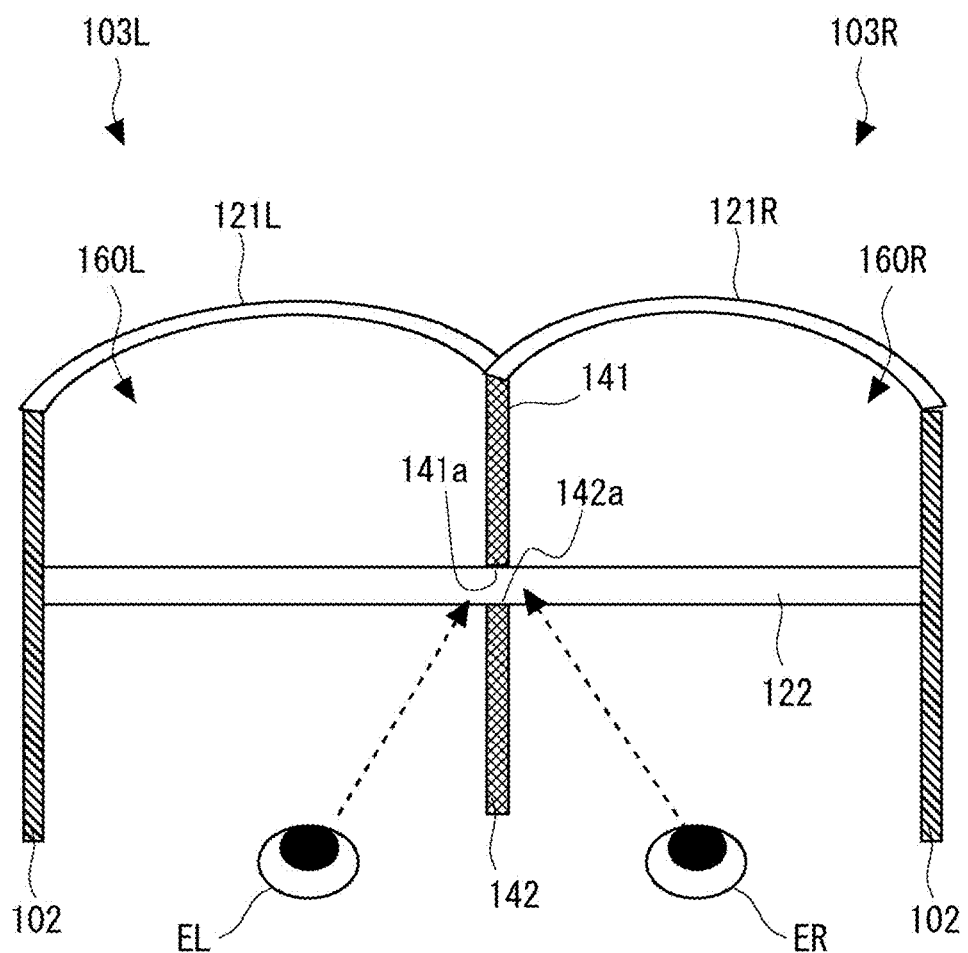
FIG. 8 is a view showing the structure in a case where the divider plates 141 and 142 are equal in thickness.
Figure 9:
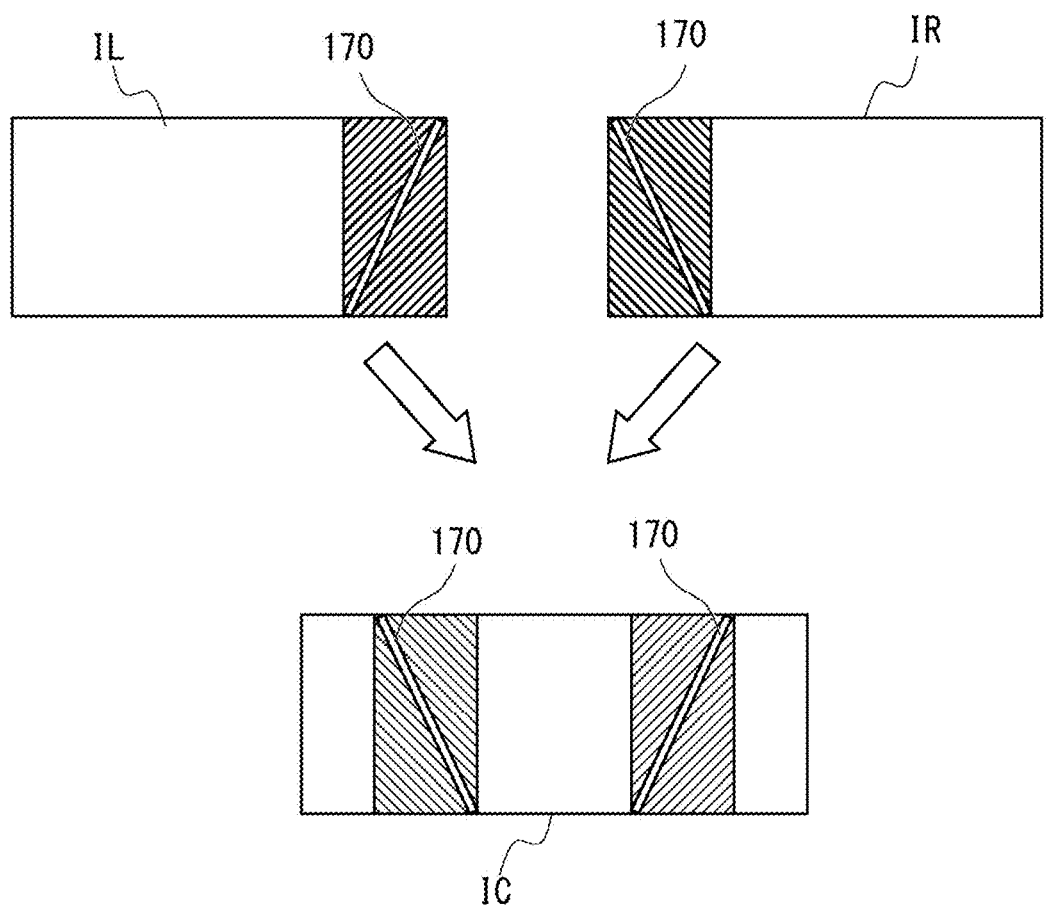
FIG. 9 is a view schematically showing an image seen with the structure in FIG. 8.
Figure 10:
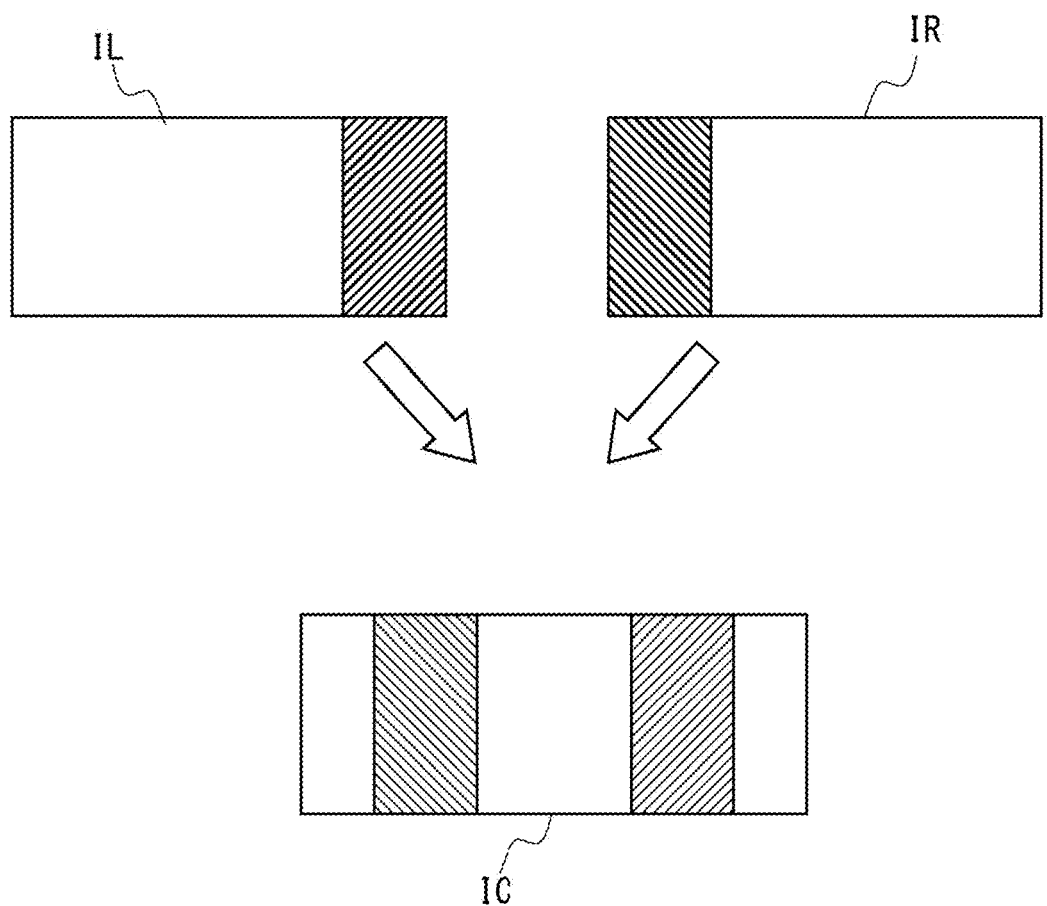
FIG. 10 is a view schematically showing an image seen with the structure in FIG. 7.

This is described with reference to FIGS. 8 to 10. FIG. 8 shows the structure of a comparative example in which the divider plate 141 and the divider plate 142 are equal in thickness. FIG. 9 is a view schematically showing images seen by the user with the structure in FIG. 8. FIG. 10 is a view schematically showing images seen by the user with the structure in FIG. 7. In FIGS. 9 and 10, an image seen by the left eye is indicated as a left-eye image 1L, an image seen by the right eye is indicated as a right-eye image IR, and an image seen by both the eyes is indicated as a both-eye image IC.

In FIG. 8, the divider plate 141 and the divider plate 142 have a constant thickness. Thus, the divider plate 142 is not formed thicker than the thickness of the end 141a of the divider plate 141. The divider plate 141 and the divider plate 142 are arranged away from each other at least by the thickness of the beam splitter 122.

In the case where the thickness of the divider plate 142 is the same as the thickness of the end 141a of the divider plate 141, the end 141a of the divider plate 141 is seen by the left eye EL and the right eye ER. Further, not only the end 141a, but also the combiner 121R located at a place to which a light ray from the left eye EL toward diagonally forward right travels, outside light, the inner side of the frame 102, and the like may be seen. The combiner 121L located at a place to which a light ray from the right eye ER toward diagonally forward left travels, outside light, the inner side of the frame 102, and the like may also be seen. When the display light PL11 and the like enter the end 141a of the divider plate 141, the combiners 121L and 121R, outside light, the inner side of the frame 102, and the like, light is reflected toward the left eye EL or the right eye ER, and passes through the beam splitter 122 to enter the left eye EL or the right eye ER. Thus, as shown in FIG. 9, the left-eye image 1L, the right-eye image IR, and the both-eye image IC seen by the user include a bright diagonal line 170. Reflection at the end 141a or the like causes the diagonal line 170 to be formed in an image to be seen. The boundary between the divider plate 141 and the divider plate 142 shine brightly, which causes the user to see the diagonal line 170.

In contrast, the end 142a is thicker than the end 141a in this embodiment, as shown in FIG. 7. Light that has been reflected by the end 141a, the combiners 121L and 121R, outside light, the inner side of the frame 102, and the like to travel toward the left eye EL or the right eye ER is blocked by the end 142a. This allows the user to see the left-eye image 1L, the right-eye image IR, and the both-eye image IC having no diagonal line, as shown in FIG. 10. Thus, light reflected by the end 141a or the like is prevented from reaching the left eye EL or the right eye ER. In other words, the thickness of the end 142a preferably has such a thickness that the end 141a is not seen. In addition, the thickness of the end 142a preferably has such a thickness that not only the end 141a, but also the combiner 121R located at a place to which a light ray from the left eye EL toward diagonally forward right travels, outside light, the inner side of the frame 102, and the like are not seen. Further, the thickness of the end 142a preferably has such a thickness that the combiner 121L located at a place to which a light ray from the right eye ER toward diagonally forward left travels, outside light, the inner side of the frame 102, and the like are not seen. This prevents the diagonal line 170 formed by reflected light at the end 141a from being seen, which allows higher display quality to be achieved.

For example, the thickness of the end 141a of the divider plate 141 can be set at 1 mm, and the thickness of the end 142a of the divider plate 142 can be set at 2 mm. Obviously, the end 141a and the end 142a are not particularly limited in thickness. For example, the thickness of the end 142a may be more than or equal to double the thickness of the end 141a. Preferably, the divider plate 141 and the divider plate 142 are shaped bilaterally symmetrically, and are arranged at the center in the left-right direction (the X direction).

Further, since the divider plate 142 is formed to have a tapered shape and the side surface has a constant angle, a shadow is prevented from being cast on the divider plate 142 by the display light PL12, the outside light PL21, or the like. This prevents a portion that is seen darkly from locally occurring on the divider plate 142, which allows higher display quality to be obtained.

Note that although the end 142a of the divider plate 142 proximate to the beam splitter 122 is formed thicker than the end 141a of the divider plate 141, the vicinity of the end 142a may be formed thicker than the end 141a of the divider plate 141. The vicinity of the end 142a refers to a position where the end 141a or the like is not seen in a case of forming the thickness of the divider plate 142 at a position located in the −Z direction from the end 142a greater than the end 141a of the divider plate 141. Thus, the thickness of the end 142a of the divider plate 142 proximate to the beam splitter 122 or the vicinity of the end 142a is greater than the thickness of the end 141a of the divider plate 141 proximate to the beam splitter 122.

In the case where the vicinity of the end 142a of the divider plate 142 is formed thicker than the end 141a of the divider plate 141, the divider plate 142 is made thicker to the vicinity of the end 142a from the −Z side end in the +Z direction, and the shape from the vicinity of the end 142a to the end 142a is not limited. The shape of the divider plate 142 may have a uniform thickness from the vicinity of the end 142a to the end 142a, or may be made thinner from the vicinity of the end 142a toward the end 142a.

Modified Examples

Although the thickness of the divider plate 142 changes to present a tapered shape in FIG. 7, the divider plate 142 is not limited to the tapered shape. The shapes of the divider plate 142 according to modified examples are described hereinafter.

Figure 11:
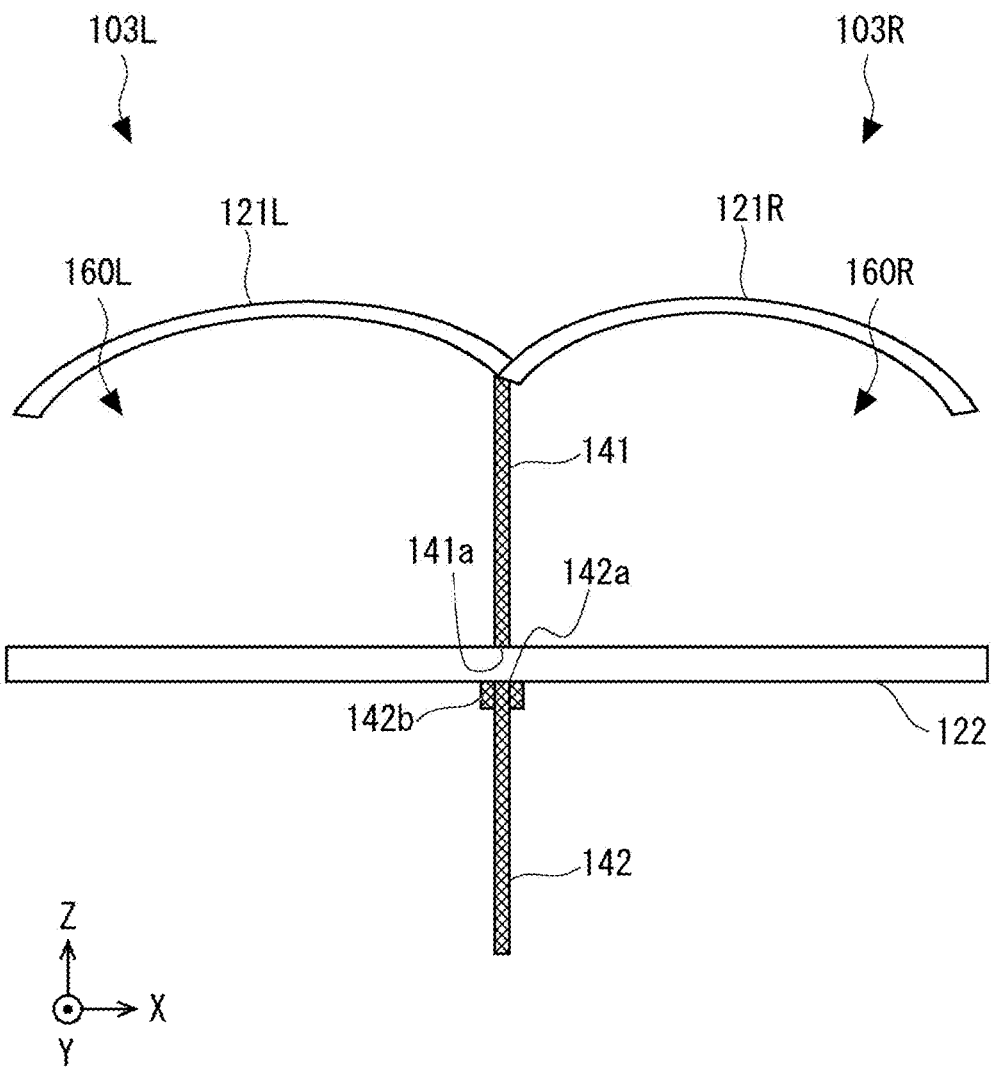
FIG. 11 is a view showing a modified example 1 of the divider plate 142.

FIG. 11 is a view showing the shape of a modified example 1 of the divider plate 142. In FIG. 11, the thickness of the divider plate 142 is changed stepwise. Thus, an X-Z section of the divider plate 142 is T-shaped. To be specific, only the end 142a of the divider plate 142 proximate to the beam splitter 122 is thick. Thus, the divider plate 142 has a thick part 142b at the end 142a proximate to the beam splitter 122.

Figure 12:
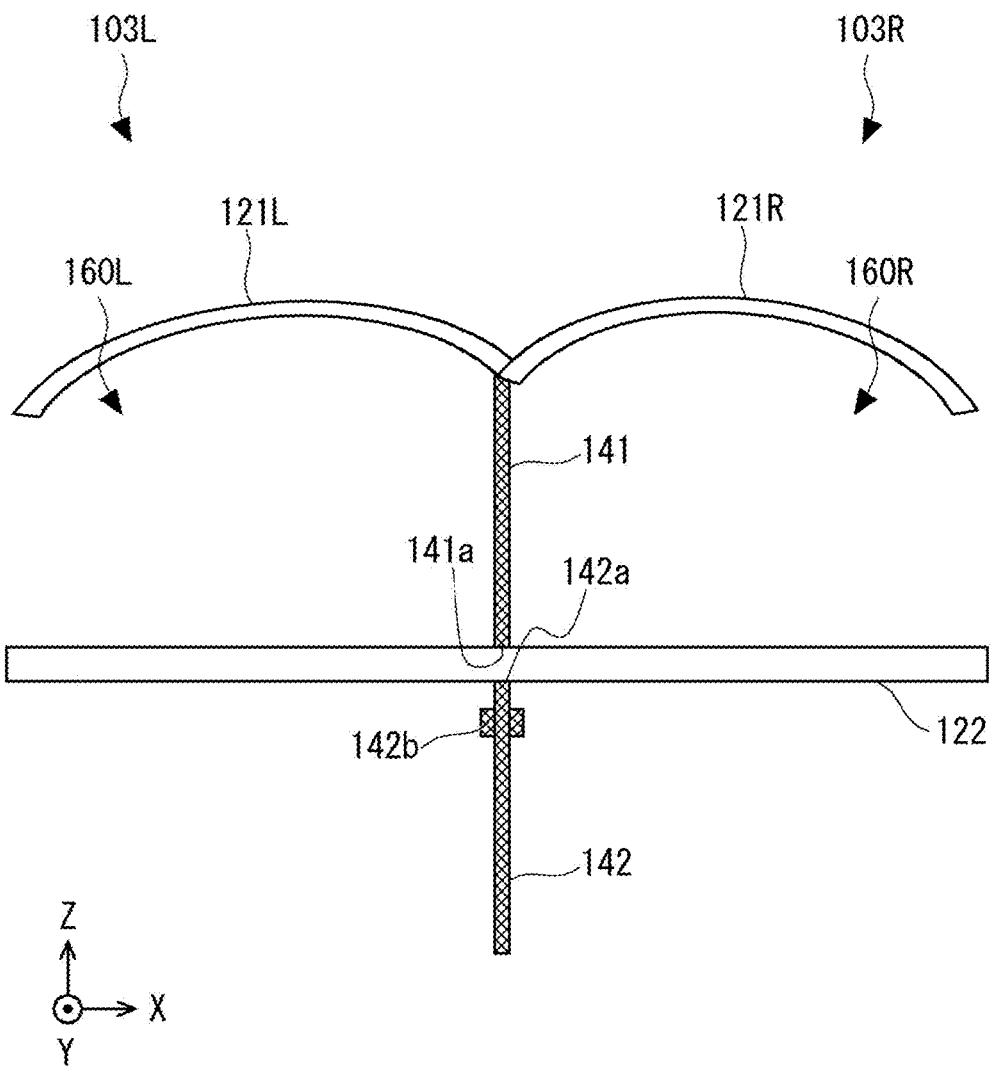
FIG. 12 is a view showing a modified example 2 of the divider plate 142.

FIG. 12 is a view showing the shape of a modified example 2 of the divider plate 142. In FIG. 12, the thickness of the divider plate 142 is changed stepwise. To be specific, a section away from the end 142a of the divider plate 142 proximate to the beam splitter 122 is thick. As shown in FIG. 12, the X-Z section of the divider plate 142 is cross-shaped. Thus, the divider plate 142 has the thick part 142b in the vicinity of the end 142a proximate to the beam splitter 122. In other words, the divider plate 142 has the thick part 142b arranged at a position away from the end 142a in the −Z direction in such a way that the end 141a or the like is not seen.

Figure 13:
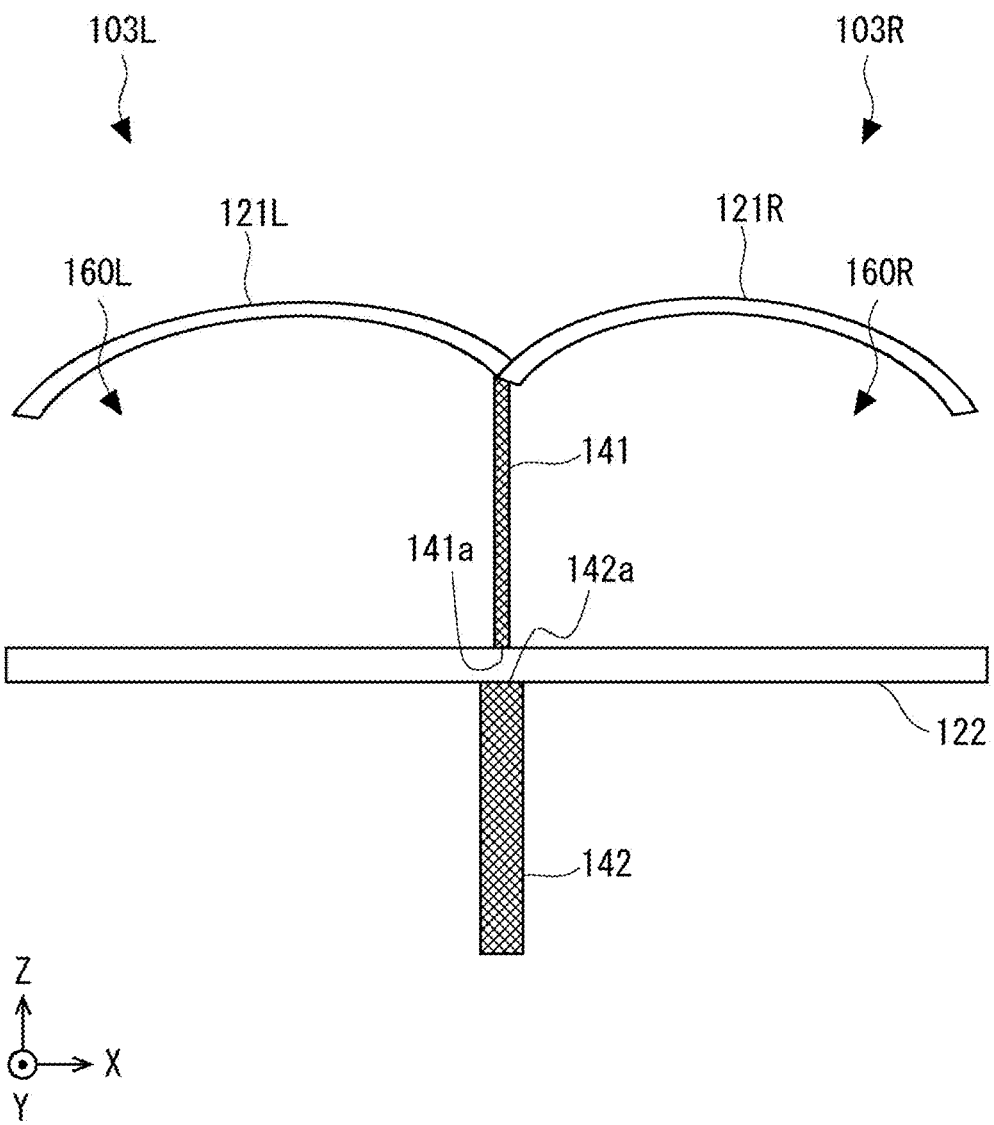
FIG. 13 is a view showing a modified example 3 of the divider plate 142.

FIG. 13 is a view showing the shape of a modified example 3 of the divider plate 142. In FIG. 13, the thickness of the divider plate 142 is constant. Thus, the divider plate 142 is entirely thicker than the thickness of the end 141a at any position in the Z direction. In the structures of the modified examples 1 to 3, reflected light that has been reflected by the end 141a or the like is blocked by the divider plate 142. This prevents the end 141a or the like from being seen by the left eye EL or the right eye ER.

The shape of the divider plate 142 is not limited to the illustrated shapes. The divider plate 142 is thicker than the thickness of the end 141a of the divider plate 141. As shown in FIGS. 7, 11, and 12, part of the divider plate 142 may be thicker than the thickness of the end 141a, or the divider plate 142 may be entirely thicker than the thickness of the end 141a as shown in FIG. 13. In other words, the divider plate 142 is partly or entirely thicker than the thickness of the end 141a. Preferably, at least the end 142a of the divider plate 142 proximate to the beam splitter 122 or the vicinity of the end 142a is thicker than the end 141a. This prevents the diagonal line 170 produced by reflected light at the end 141a of the divider plate 141 or the like from being seen. High display quality is thereby obtained.

Further, although the divider plate 141 is a parallel plate having a constant thickness in FIGS. 7, 11, 12, and 13, the shape of the divider plate 141 is not particularly limited. For example, the divider plate 141 may have a tapered shape similarly to the divider plate 142 in FIG. 7. In other words, the thickness of the divider plate 141 may be made greater from the end 141a in the +Z direction.

Figure 14:
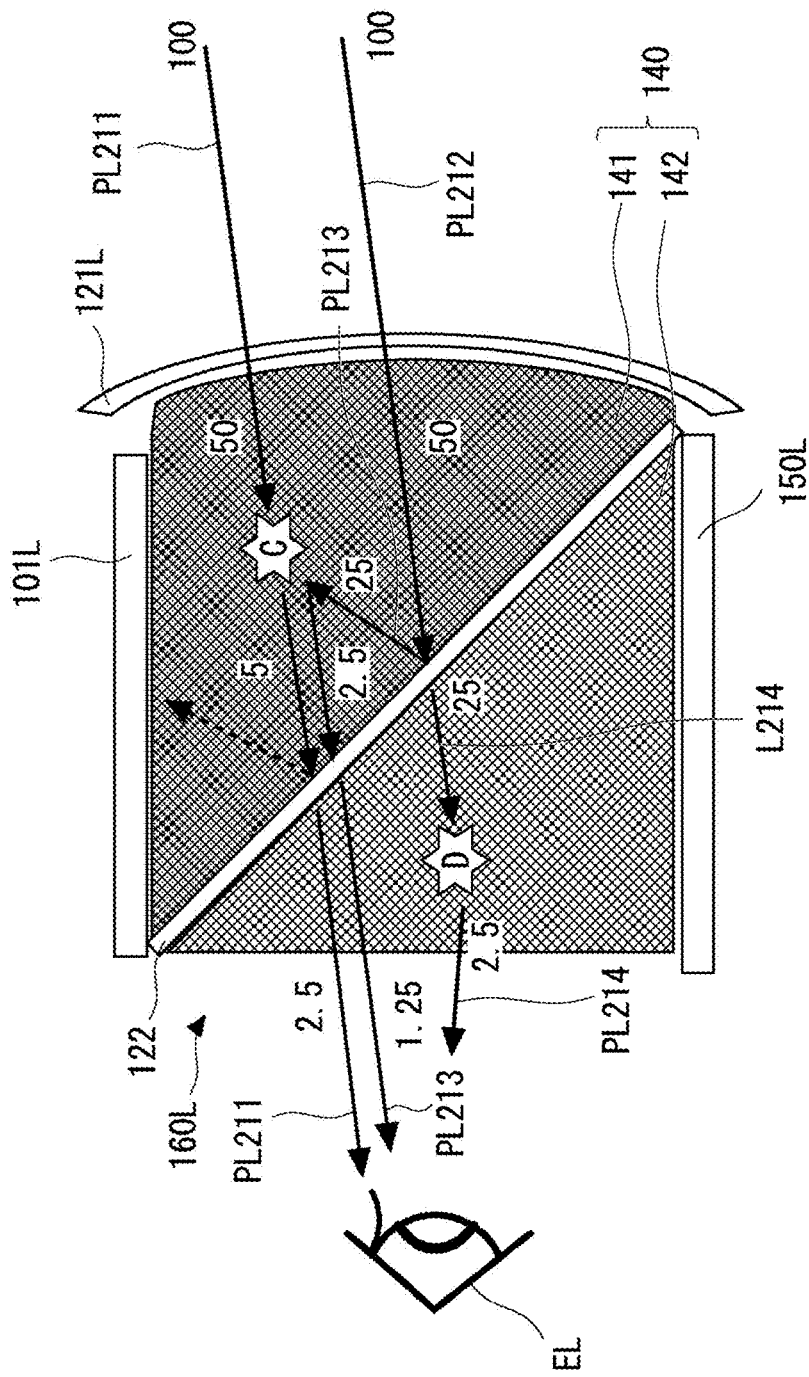
FIG. 14 is a view for describing outside light entering an eye.

Further, the divider plate 141 and the divider plate 142 may be different in values of diffuse reflectance in this embodiment. This is described with reference to FIG. 14. FIG. 14 is a view for describing the amount of outside light diffusely reflected by the divider plates 141 and 142. Note that the left-eye optical system 103L and the right-eye optical system 103R have the same structure, and therefore only the left-eye optical system 103L is described hereinafter.

Description is provided with reference to FIG. 14 assuming that approximately 10% of outside light that has been diffusely reflected by the divider plates 141 and 142 travels to the left eye EL. In other words, it is supposed that approximately 1/10 of outside light that has entered the divider plates 141 and 142 is reflected toward the left eye EL at either a location C on the divider plate 141 or a location D on the divider plate 142. It is also supposed that the transmittance of the combiner 121L and the beam splitter 122 is 50% and the reflectance is 50%.

The outside light PL211 to be diffusely reflected by the divider plate 141 before entering the beam splitter 122 is described first. The outside light PL211 that has passed through the combiner 121L enters the divider plate 141 at the location C. Herein, when it is assumed that the amount of the outside light PL211 before entering the combiner 121L is 100, the amount of the outside light PL211 that has passed through the combiner 121L is 50 (=100×0.5).

Then, part of the outside light PL211 that has been diffused at the location C passes through the beam splitter 122 and enters the left eye EL. The amount of the outside light PL211 that has been diffused at the location C and travels toward the left eye EL is 5 (=50×0.1). Further, the amount of the outside light PL211 that passes through the beam splitter 122 and reaches the left eye EL is 2.5 (=5×0.5).

The outside light PL212 to be diffusely reflected after entering the beam splitter 122 is described hereinafter. The outside light PL212 enters the beam splitter 122 after passing through the combiner 121L. Thus, half of the outside light PL212 that has passed through the combiner 121L passes through the beam splitter 122, and the remaining half is reflected by the beam splitter 122. Of the outside light PL212, light that has been reflected by the beam splitter 122 is referred to as outside light PL213. Of the outside light PL212, light that has passed through the beam splitter 122 is referred to as outside light PL214.

When it is assumed that the amount of the outside light PL212 before entering the combiner 121L is 100, the amount of the outside light PL212 immediately after passing through the combiner 121L is 50 (=100×0.5). Further, the amount of the outside light PL213 immediately after being reflected by the beam splitter 122 is 25 (=50×0.5). The amount of the outside light PL214 immediately after passing through the beam splitter 122 is 25 (=50×0.5).

Then, the outside light PL213 is diffusely reflected by the divider plate 141 at the location C. Part of the outside light PL213 that has been diffusely reflected by the divider plate 141 travels toward the left eye EL. The amount of the outside light PL213 that has been diffusely reflected by the divider plate 141 and travels toward the left eye EL is 2.5 (=25×0.1). Further, the outside light PL213 enters the left eye EL after passing through the beam splitter 122. Thus, the amount of the outside light PL213 that reaches the left eye EL is 1.25 (=2.5×0.5).

The outside light PL214 is diffusely reflected by the divider plate 142 at the location D. Part of the outside light PL214 that has been diffusely reflected by the divider plate 142 travels toward the left eye EL. The amount of the outside light PL214 that has been diffusely reflected by the divider plate 142 and travels toward the left eye EL is 2.5 (=25×0.1). Thus, the amount of the outside light PL214 that reaches the left eye EL is 2.5.

Therefore, the total amount of the outside light PL211 and the outside light PL213 that have been diffusely reflected at the location C is 3.75 (=2.5+1.25). On the other hand, the amount of the outside light PL214 that has been diffusely reflected at the location D is 2.5. A difference arises in brightness seen by the user between the location C and the location D. The location C is seen brighter than the location D by the user. In other words, the divider plate 141 is seen brighter than the divider plate 142 by the user.

Thus, in this embodiment, the divider plate 141 and the divider plate 142 have different values of diffuse reflectance. To be specific, the diffuse reflectance of the divider plate 142 is made higher than the diffuse reflectance of the divider plate 141. This reduces the difference in brightness between the divider plate 141 and the divider plate 142, which allows higher display quality to be obtained. In other words, by adjusting the divider plate 141 and the divider plate 142 in diffuse reflectance, non-uniformity of brightness of the divider part 140 is corrected. This allows higher display quality to be obtained.

Note that the divider plate 141 is colored by a color darker than that of the divider plate 142. This allows the light diffuse reflectance of the divider plate 142 to be higher than the light diffuse reflectance of the divider plate 141. By setting the diffuse reflectance of the divider plate 142 at approximately 1.5 times the diffuse reflectance of the divider plate 141, the user is able to see the divider plate 141 at a brightness of the same degree as the divider plate 142. Obviously, the diffuse reflectance of the divider plate 142 may be more than or equal to, or less than or equal to 1.5 times the diffuse reflectance of the divider plate 141.

The diffuse reflectance is made different by coloring the divider plate 141 and the divider plate 142 by colors of the same type that are different only in grayscale. In a case where the divider plate 141 and the divider plate 142 are gray, the mixing ratio of white and black is changed to change the grayscale, thereby making the diffuse reflectance different. In a case of obtaining dark gray having low diffuse reflectance, a color having an increased ratio of black is used, and in a case of obtaining light gray having high diffuse reflectance, a color having an increased ratio of white is used.

The diffuse reflectance may be made different by subjecting the surfaces of the divider plate 141 and the divider plate 142 to different diffuse reflection treatments between the front side (in the +Z direction) and back side (in the −Z direction) of the beam splitter 122. One of the divider plate 141 and the divider plate 142 is subjected to diffuse reflection treatment for obtaining high diffuse reflectance, and the other is subjected to diffuse reflection treatment for obtaining low diffuse reflectance. In a case of increasing the diffuse reflectance, the pitch of irregularities is narrowed, and in a case of decreasing the diffuse reflectance, the pitch of irregularities is widened.

In a case where the divider plate 141 and the divider plate 142 have skin tones, the diffuse reflectance is made different by changing visual reflectance obtained by quantifying reflectance that a human being senses visually, thereby to change the grayscale of skin tones. Since the visual reflectance expresses brightness (luminance) that is not expressed by the CIE chromaticity diagram, only the visual reflectance is changed without changing the CIE chromaticity coordinates of the colors of the divider plate 141 and the divider plate 142. In a case of obtaining a dark skin tone having low diffuse reflectance, a skin tone having low visual reflectance is used, and in a case of obtaining a light skin tone having high diffuse reflectance, a skin tone having high visual reflectance is used.

By changing the grayscale of colors of the divider plates 141 and 142 or visual reflectance, and changing the pitch of irregularities of the surfaces of the divider plates 141 and 142, the diffuse reflectance of the divider part 140 is made different between the front side (in the +Z direction) and the back side (in the −Z direction) of the beam splitter 122. This allows the user to naturally see the divider plate 141 and the divider plate 142, which improves display quality.

Figure 15:
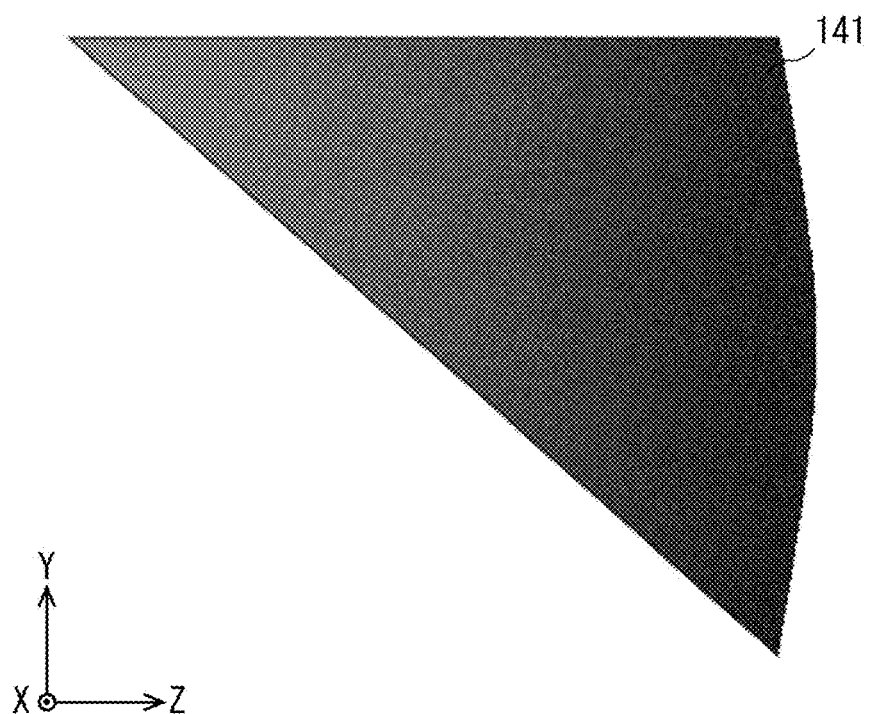
FIG. 15 is a view showing a spatial distribution of diffuse reflectance of the divider plate.

Further, a spatial distribution of diffuse reflectance may be provided in the divider plate 141. As shown in FIG. 15, for example, the diffuse reflectance of the divider plate 141 may be decreased forward (in the +Z direction). FIG. 15 shows that a portion of a darker color has lower diffuse reflectance and a portion of a lighter color has higher diffuse reflectance. Alternatively, the diffuse reflectance of the divider plate 141 may be increased forward (in the +Z direction). Further, a spatial distribution of diffuse reflectance may be provided in the divider plate 141 in the up-down direction (the Y direction). Likewise, a spatial distribution of diffuse reflectance may be provided in the divider plate 142. In other words, spatial distributions are provided for the diffuse reflectances of the divider plates 141 and 142 in such a way that the divider part 140 is not displayed with emphasis.

Modified Example 4

Figure 16:
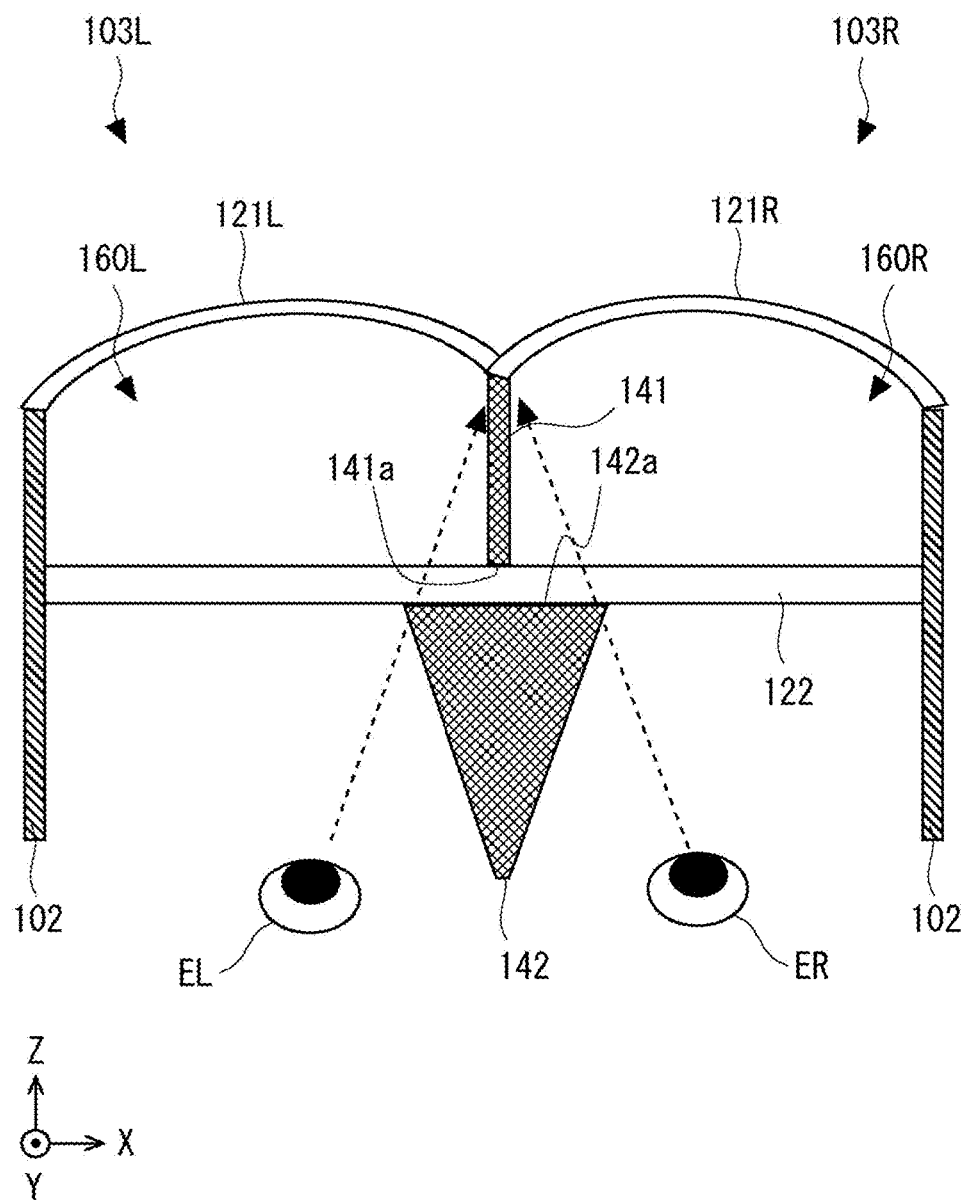
FIG. 16 is a view showing a modified example 4 of the divider plate 142.

FIG. 16 is a view showing the shape of a modified example 4 of the divider plate 142. In FIG. 16, the thickness of the divider plate 142 changes to present a tapered shape. To be specific, the thickness of the divider plate 142 is made thicker from the −Z side end in the +Z direction, similarly to FIG. 7. Further, the thickness of the end 142a of the divider plate 142 proximate to the beam splitter 122 is thicker than in FIG. 7. To be specific, the end 142a of the divider plate 142 is formed to have such a thickness that the user is not able to see a first divider plate. The divider plate 142 hides not only the end 141a of the divider plate 141, but also the entirety of the divider plate 141.

This prevents the entirety of the divider plate 141 from being seen. In other words, since the end of the divider plate 141 on the front side (the +Z side) is hidden by the divider plate 142, the user is not able to see the divider plate 141. Light that has been reflected by the divider plate 141 and travels toward the left eye EL or the right eye ER is blocked by the divider plate 142. As described above, the divider plate 141 and the divider plate 142 are seen by the user under different optical conditions. In this modified example, the end 142a of the divider plate 142 is made thick so as to hide the divider plate 141 from the user. This improves display quality. The sense of discomfort due to the difference in brightness is thereby reduced, which improves the sense of immersion.

Note that the end 142a of the divider plate 142 has a thickness that hides the divider plate 141 as a whole in FIG. 16, but may have a thickness that hides the divider plate 141 only partly. Thus, the end 142a of the divider plate 142 is formed to have such a thickness that at least part of the first divider plate is not seen from the user. In other words, the divider plate 142 may be formed to have such a thickness that the end of the divider plate 141 on the front side (the +Z side) is seen by the user. Even in this case, the sense of discomfort due to the difference in brightness between the divider plate 141 and the divider plate 142 is reduced.

In this manner, the divider plate 141 is hidden by the divider plate 142 as seen from the user. In other words, since the divider plate 141 is masked by the divider plate 142, the divider plate 141 is not seen from the user. This improves display quality.

Note that although the divider plate 142 has a tapered shape, that is, an inverted triangular shape in FIG. 16, the structures of the modified examples 1 to 3 shown in FIGS. 11 to 13 may be adopted. For example, the end 142a may be provided with the thick part 142b as shown in FIG. 11. In this case, the thick part 142b which is opaque is interposed between the left eye EL or the right eye ER and the divider plate 141. This allows the divider plate 141 to be hidden from the user. In the modified example 4, the divider plate 142 which is opaque is interposed on a line that connects the left eye EL and any point on the divider plate 141, for example. Likewise, the divider plate 142 which is opaque is interposed on a line that connects the right eye ER and any point on the divider plate 141.

Modified Example 5

Figure 17:
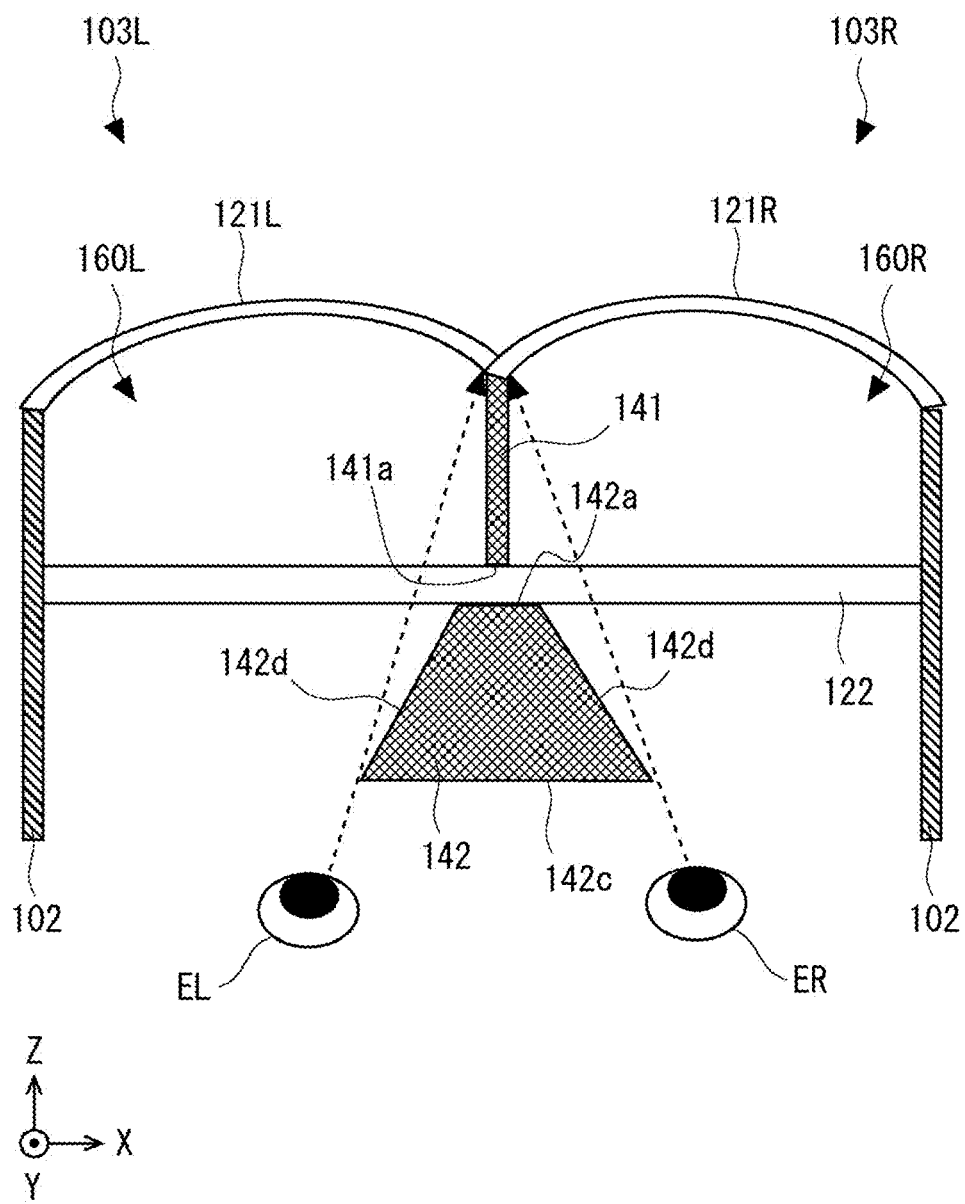
FIG. 17 is a view showing a modified example 5 of the divider plate 142.

FIG. 17 is a view showing the shape of a modified example 5 of the divider plate 142. FIG. 17 shows a tapered shape reversed to that of FIG. 7 or FIG. 16. To be specific, the thickness of the divider plate 142 gradually increases from the +Z side end in the −Z direction. Note that a surface of the divider plate 142 on the −Z side (the rear side) is referred to as a bottom surface 142c, and surfaces on the +X side (the right side) and the −X side (the left side) are referred to as side surfaces 142d. The bottom surface 142c is a surface to be opposite to the user's face. The side surface 142d is a surface to be opposite to the left front space 160L or the right front space 160R.

The divider plate 142 has a tapered shape that is gradually made thinner forward. Thus, in the divider plate 142, the bottom surface 142c is the thickest, and the end 142a is the thinnest. This structure allows the end 141a and the divider plate 141 to be hidden by the divider plate 142, similarly to the modified example 4. In other words, the end 141a and the divider plate 141 are hidden by the bottom surface 142c and are not seen by the user. This improves display quality.

Further, the side surfaces 142d of the divider plate 142 are hidden by the bottom surface 142c and are not seen by the user. Thus, shadows cast on the side surfaces 142d are not seen, which improves display quality.

Note that although the thickness of the end 142a is greater than the thickness of the end 141a in FIG. 17, the thickness of the end 142a may be smaller than or equal to the thickness of the end 141a. In other words, the shape of the divider plate 142 is not particularly limited as long as the end 141a is hidden by the bottom surface 142c. The divider plate 142 preferably has such a shape and size that display light that has been reflected by the combiner 121L or 121R toward the left eye EL or the right eye ER is not blocked. To be specific, the divider plate 142 is arranged so as not to block the line of sight from the left eye EL to the combiner 121L and the line of sight from the right eye ER to the combiner 121R.

Further, the divider plate 142 may support fixing of the beam splitter 122. For example, when the end 142a abuts against the beam splitter 122, the position of the beam splitter 122 is controlled.

Second Embodiment

Figure 18:
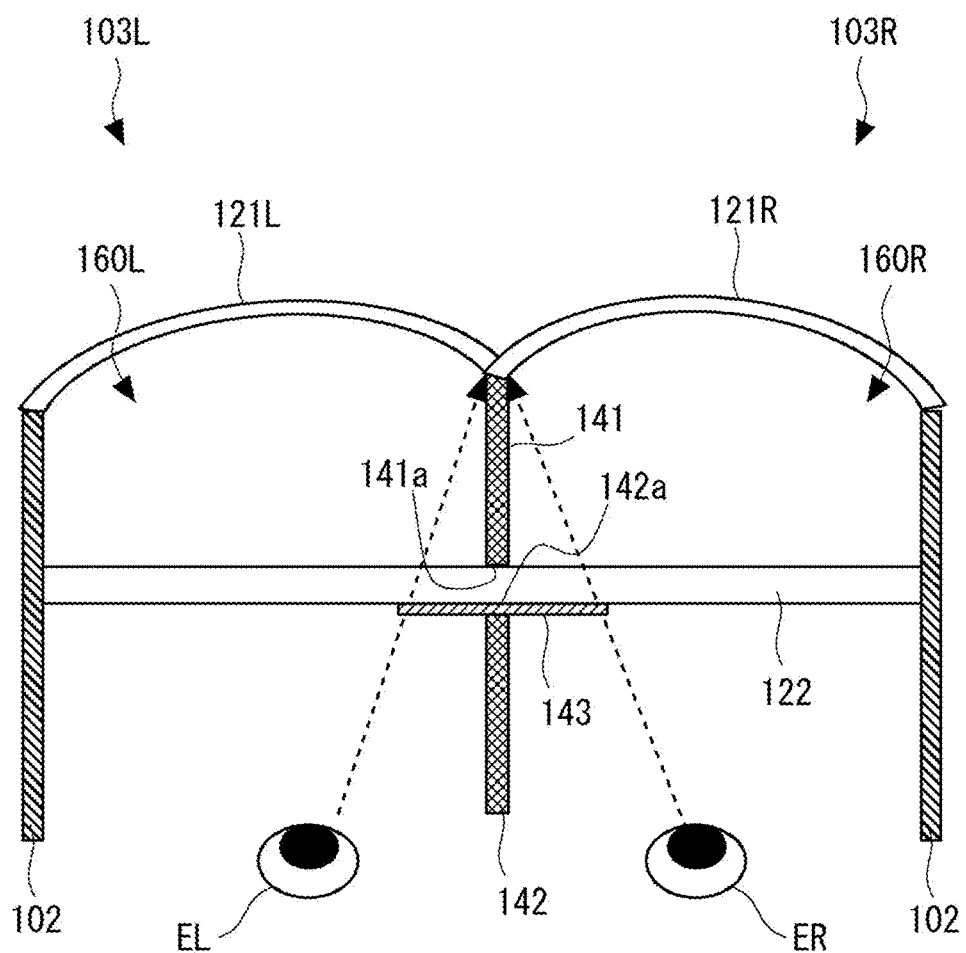
FIG. 18 is a top view schematically showing the structure of a second embodiment.
Figure 19:
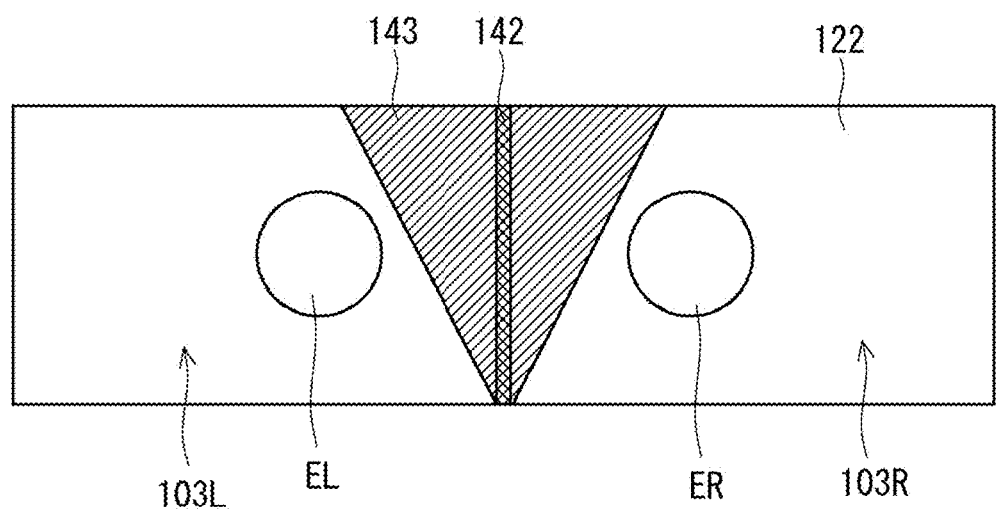
FIG. 19 is a schematic view of the structure of the second embodiment as seen from behind.
Figure 20:
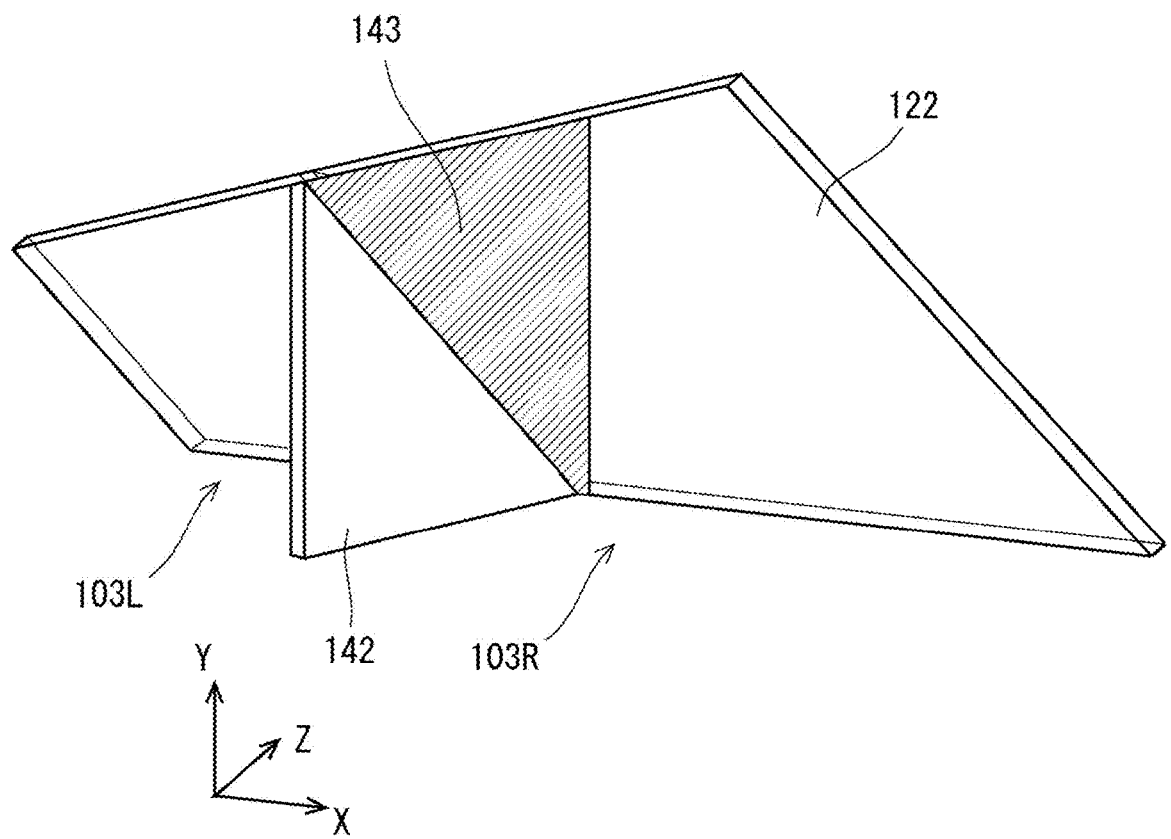
FIG. 20 is a schematic view of the structure of the second embodiment as seen from the right eye side.

In a second embodiment, the divider plate 141 is hidden from the user using a member other than the divider plate 142. FIG. 18 is a top view showing the structure of the second embodiment. FIG. 19 is a schematic view of the structure of the second embodiment as seen from behind. FIG. 20 is a schematic view of the structure of the second embodiment as seen from the right eye side. To be specific, a mask member 143 is provided as shown in FIGS. 18 to 20. Note that the structure except the mask member 143 is the same as that of the first embodiment, and description thereof is thus omitted. Further, components such as the combiners 121L, 121R, and the like are omitted in FIGS. 19 and 20 as appropriate.

The mask member 143 is installed on the beam splitter 122, for example. Herein, the mask member 143 is installed on a surface of the beam splitter 122 on the rear side (the −Z side). Alternatively, the mask member 143 may be installed on the divider plate 142, the frame 102, or the like. The mask member 143 is a triangular sheet. Obviously, the mask member 143 is not limited to the triangular shape as long as the divider plate 141 is hidden. An adhesive sheet may be adopted as the mask member 143, and may be bonded to the beam splitter 122. The mask member 143 may be a flexible member such as a thin sheet, or a plate-like member having a certain thickness. Light that has been reflected by the divider plate 141 and travels toward the left eye EL or the right eye ER is blocked by the mask member 143. This improves display quality similarly to the modified example 4.

The mask member 143 preferably has an optical property equivalent to that of the divider plate 142. For example, it is preferable to adopt a member having the same color and the same diffuse reflectance as the divider plate 142. This reduces the sense of discomfort due to the difference in brightness, which improves the sense of immersion.

The mask member 143 is arranged bilaterally symmetrically with respect to the divider plate 142. Alternatively, the mask member 143 may include separate members in a region on the left side (the −X side) and a region on the right side (the +X side) with respect to the divider plate 142, or may be a common member.

Note that the mask member 143 has such a size that the divider plate 141 is entirely hidden, but may have a size that the end 141a of the divider plate 141 is hidden. For example, the mask member 143 may have a size of the same degree as the thick part 142b in FIG. 11. Even in this case, light that has been reflected by the end 141a of the divider plate 141 and travels toward the left eye EL or the right eye ER is blocked by the mask member 143. This improves display quality similarly to the first embodiment.

In this manner, in the first and second embodiments and their modified examples, the end 141a of the first divider plate 141 proximate to the beam splitter 122 is hidden from the user. Hiding the end 141a from the user indicates a state in which the end 141a is not seen from the user. For example, since an opaque member (the divider plate 142 or the mask member 143) is interposed between the left eye EL or the right eye ER of the user and the end 141a, the end 141a is hidden from the user. Such an opaque member may be the divider plate 142 itself, a member installed on the divider plate 142, or a member different from the divider plate 142.

By making the divider plate 142 thick as shown in FIGS. 7, 11 to 13, and the like, for example, the end 141a of the divider plate 141 is hidden from the user. Since the end 141a of the divider plate 141 is not seen, the bright diagonal line 170 (see FIG. 9) is prevented from being seen. This allows the user to see an image without a sense of discomfort.

Further, the end 141a of the divider plate 141 may be masked by providing the mask member 143 different from the divider plate 141 as in the second embodiment. The mask member 143 is arranged between the left eye EL or the right eye ER and the divider plate 141.

The end 141a may be masked using an opaque member such as the divider plate 142 or the mask member 143. Since the end 141a of the divider plate 141 is not seen, the bright diagonal line 170 (see FIG. 9) is prevented from being seen. This allows the user to see an image without a sense of discomfort. Further, the divider plate 142 or the mask member 143 may hide the divider plate 141 entirely as shown in FIG. 16 and the like, or may hide only part of the divider plate 141 proximate to the end 141a as shown in FIGS. 7, 11, and the like.

Third Embodiment

Figure 21:
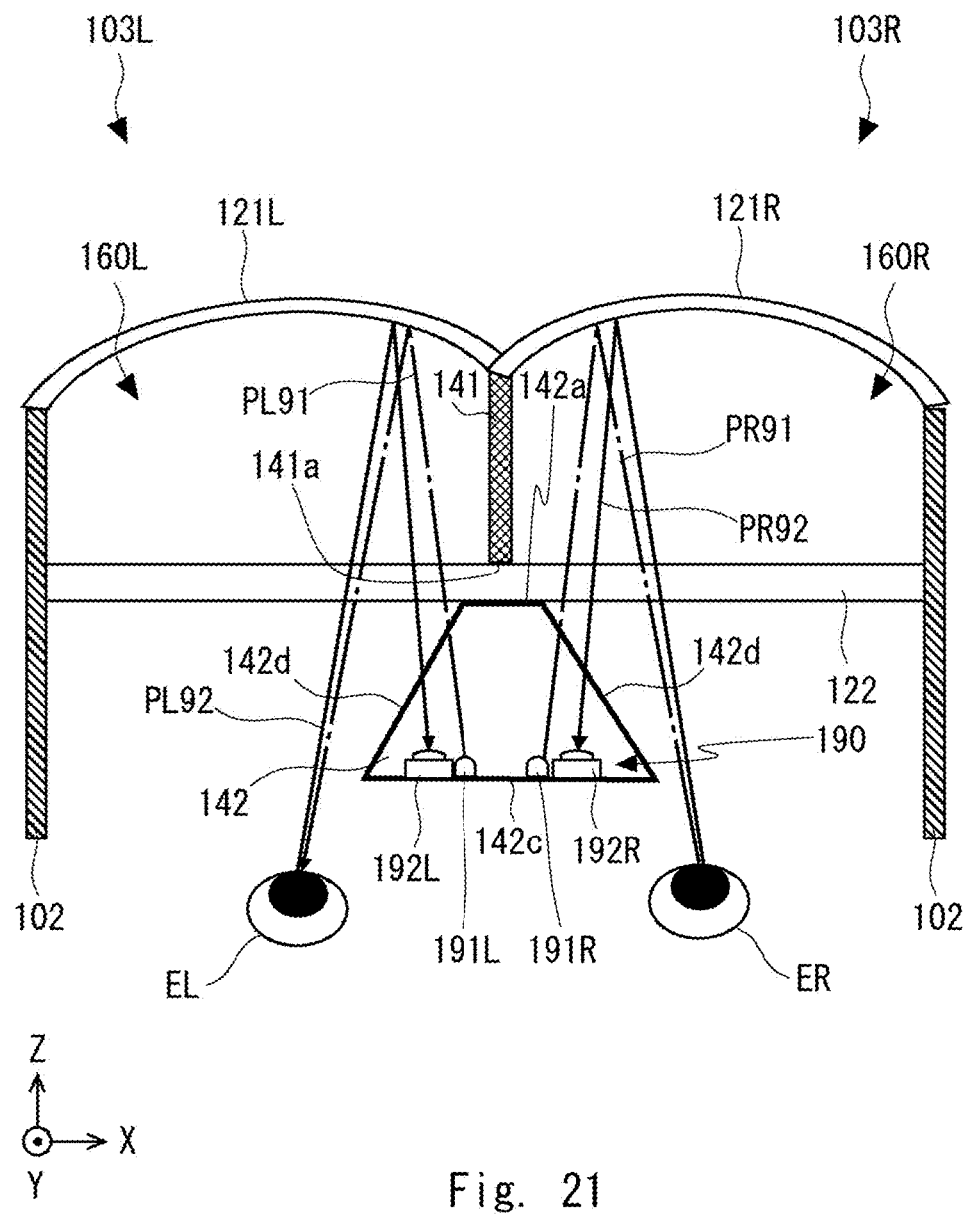
FIG. 21 is a top view schematically showing the structure of a third embodiment.
Figure 22:
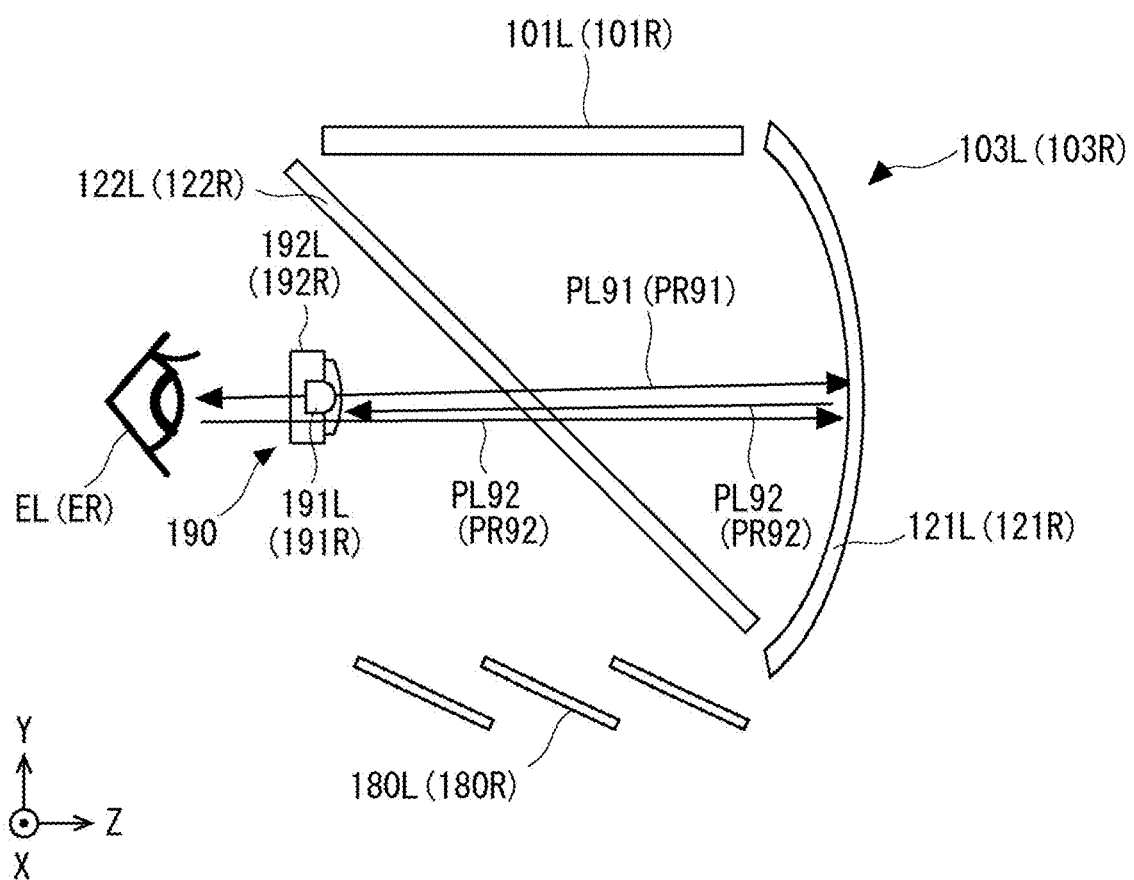
FIG. 22 is a side view schematically showing the structure of the third embodiment.

In a third embodiment, the divider plate 142 is provided with a light source and optical sensors for detecting a line of sight. The head-mounted display 100 according to the third embodiment is described with reference to FIGS. 21 and 22. FIGS. 21 and 22 are a top view and a side view schematically showing the structure of the head-mounted display 100, respectively, which are simplified as appropriate. In FIG. 22, for example, the divider plate 141 and the divider plate 142 are omitted.

In the third embodiment, a line-of-sight detection unit 190 for detecting a line of sight is added to the structure in FIG. 17. To be specific, the line-of-sight detection unit 190 includes light sources 191L, 191R and optical sensors 192L, 192R. The line-of-sight detection unit 190 is arranged within the divider plate 142. Further, lower windows 180L and 180R are provided instead of the light shielding parts 150L and 150R shown in FIG. 3. Note that the basic structure of the head-mounted display 100 is the same as that of the above-described first and second embodiments, and description is thus omitted as appropriate.

In the X direction, the light sources 191L, 191R and the optical sensors 192L, 192R are arranged between the left eye EL and the right eye ER. In the Y direction, the light sources 191L, 191R and the optical sensors 192L, 192R are arranged at substantially the same position as the left eye EL and the right eye ER. To be specific, the light sources 191L, 191R and the optical sensors 192L, 192R are installed on the divider plate 142. The light source 191L and the optical sensor 192L are arranged to face the combiner 121L. The light source 191R and the optical sensor 192R are arranged to face the combiner 121R.

The light sources 191L and 191R are infrared LEDs (Light Emitting diodes), and output infrared light PL91 and PR91, respectively. The infrared light PL91 from the light source 191L enters the combiner 121L through the beam splitter 122. The infrared light PL91 that has been reflected by the combiner 121L enters the left eye EL. In other words, the infrared light PL91 from the light source 191L becomes illumination light that illuminates the left eye EL.

Likewise, the infrared light PR91 from the light source 191R enters the combiner 121R through the beam splitter 122. The infrared light PR91 that has been reflected by the combiner 121R enters the right eye ER. In other words, the infrared light PR91 from the light source 191R becomes illumination light that illuminates the right eye ER. The use of infrared light as illumination light reduces an influence upon a display image.

The optical sensors 192L and 192R are infrared cameras, respectively, and detect infrared light. To be specific, the optical sensor 192L captures an image of and around the left eye EL, and the optical sensor 192R captures an image of and around the right eye ER.

As described above, the left eye EL is illuminated with the infrared light PL91. Reflected light that has been reflected by the pupil of the left eye EL is referred to as reflected light PL92. The reflected light PL92 from the pupil of the left eye EL enters the combiner 121L through the beam splitter 122. The reflected light PL92 that has been reflected by the combiner 121L enters the optical sensor 192L. The optical sensor 192L thus captures an image of the left eye EL. A behavior of the line of sight of the left eye EL is thereby detected.

Likewise, the right eye ER is illuminated with the infrared light PR91. Reflected light that has been reflected by the pupil of the right eye ER is referred to as the reflected light PR92. The reflected light PR92 from the pupil of the right eye ER enters the combiner 121R through the beam splitter 122. Reflected light PR92 that has been reflected by the combiner 121R enters the optical sensor 192R. The optical sensor 192R thus captures an image of the right eye ER. A behavior of the line of sight of the left eye ER is thereby detected.

In accordance with detection results of the optical sensors 192L and 192R, the directions of the lines of sight of the left eye EL and the right eye ER are estimated. By detecting a positional change of a pupil with respect to a reference point, for example, a line of sight is detected. Note that existing processing is used for an algorithm for detecting the line of sight, and description thereof is thus omitted. Further, the control unit 105 may generate a display image in accordance with the detected line of sight. In other words, the control unit 105 may change the display image in accordance with the direction of the line of sight.

In this embodiment, the line-of-sight detection unit 190 is arranged within the divider plate 142. To be specific, the light sources 191L, 191R and the optical sensors 192L, 192R are fixed to the bottom surface 142c of the divider plate 142. The light sources 191L, 191R and the optical sensors 192L, 192R are arranged to face forward (in the +Z direction). In this case, the side surfaces 142d of the divider plate 142 may be formed of a material that transmits infrared light. Alternatively, portions of the side surfaces 142d of the divider plate 142 may be windows that transmit infrared light.

Therefore, the infrared light PL91 and PR91 of the light sources 191L and 191R are output forward. The infrared light PL91 and PR91 enter the combiners 121L and 121R. Then, the combiners 121L and 121R reflect the infrared light PL91 and PR91. Therefore, the infrared light PL91 and PR91 enter the left eye EL and the right eye ER through the beam splitter 122. Further, the reflected light PL92 and PR92 that have been reflected by the left eye EL and the right eye ER enter the combiners 121L and 121R. The combiners 121L and 121R reflect the reflected light PL92 and PR92 backward. Then, the optical sensors 192L and 192R detect the reflected light PL92 and PR92 through the beam splitter 122.

This prevents the line-of-sight detection unit 190 from interrupting a field of vision. In other words, the line-of-sight detection unit 190 is arranged within the divider plate 142, and is thus not seen from the user. Since the line-of-sight detection unit 190 does not interrupt the user's field of vision, the user is able to see a view in the front (in the +Z direction) and a display image properly. For example, the side surfaces 142d of the divider plate 142 have an optical property that absorbs visible light and transmits infrared light. This prevents the user from seeing the light sources 191L, 191R and the optical sensors 192L, 192R.

Note that light for detecting the line of sight is light other than visible light, and ultraviolet light can also be used, for example. Note that it is preferable to use infrared light to ultraviolet light in order to reduce the influence on the pupils.

Note that although FIGS. 21 and 22 illustrate the light source 191L and the optical sensor 192L as separate elements, the light source 191L and the optical sensor 192L may be mounted on an integral chip. The light source 191R and the optical sensor 192R may be mounted on an integral chip. The light source 191L and the light source 191R may be integral. The optical sensor 192L and the optical sensor 192R may be integral. Further, a single light source may be adopted, and a single optical sensor may be adopted.

Note that, as shown in FIG. 22, the lower windows 180L and 180R have a louvered structure, for example. To be specific, the lower windows 180L and 180R have a plurality of light shielding plates inclined diagonally. This allows the user to ensure a field of vision in the diagonally lower front. Note that the light shielding parts 150L and 150R in FIG. 3 may be used instead of the lower windows 180L and 180R.

Modified Example 6

Figure 23:
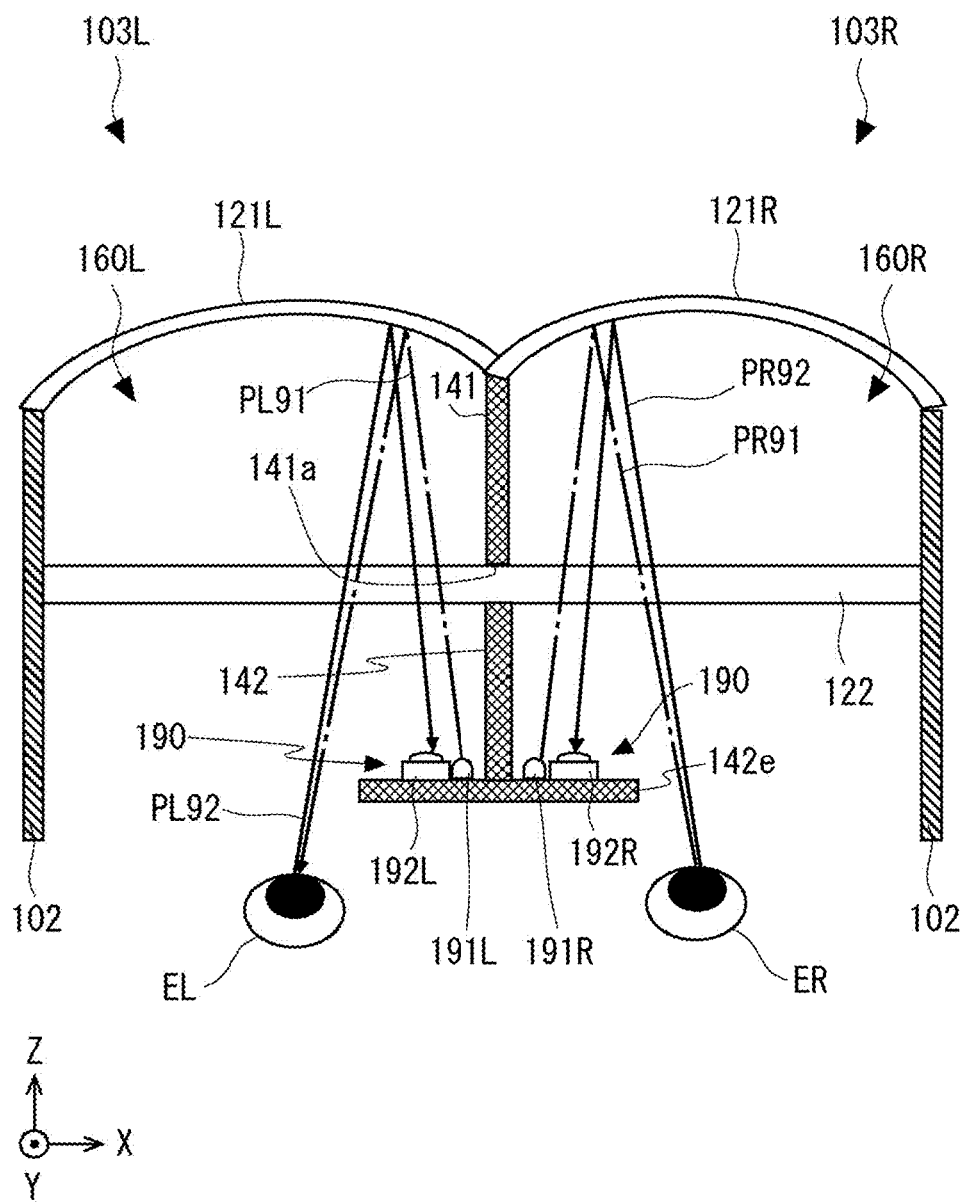
FIG. 23 is a top view schematically showing the structure of a modified example 6.

Note that although the line-of-sight detection unit 190 is arranged within the divider plate 141 in FIG. 21, the position of the line-of-sight detection unit 190 is not limited to the inside of the divider plate 142. A modified example 6 of the arrangement of the line-of-sight detection unit 190 is described with reference to FIG. 23. FIG. 23 is a top view schematically showing the arrangement of the light sources 191L, 191R and the optical sensors 192L, 192R.

As shown in FIG. 23, the divider plate 142 is T-shaped in the X-Y plan view. In other words, the divider plate 142 has a bottom part 142e. In the divider plate 142, the bottom part 142e is arranged at a −Z side end. The bottom part 142e is a flat plate parallel to the X-Y plane. Then, the bottom part 142e is arranged so as to hide the end 141a from the user.

The light sources 191L, 191R and the optical sensors 192L, 192R are installed on the bottom part 142e of the divider plate 142. To be specific, the light sources 191L, 191R and the optical sensors 192L, 192R are fixed to a +Z side surface of the bottom part 142e. The light source 191L and the optical sensor 192L are arranged to face the combiner 121L. The light source 191R and the optical sensor 192R are arranged to face the combiner 121R. This allows a line of sight to be detected similarly to the structure in FIG. 21.

Obviously, the light sources 191L, 191R and the optical sensors 192L, 192R are not limited to the arrangements in FIGS. 21 to 23. The light source 191L and the optical sensor 192L are arranged to face the combiner 121L. Further, the light source 191R and the optical sensor 192R are arranged to face the combiner 121R.

Figure 24:
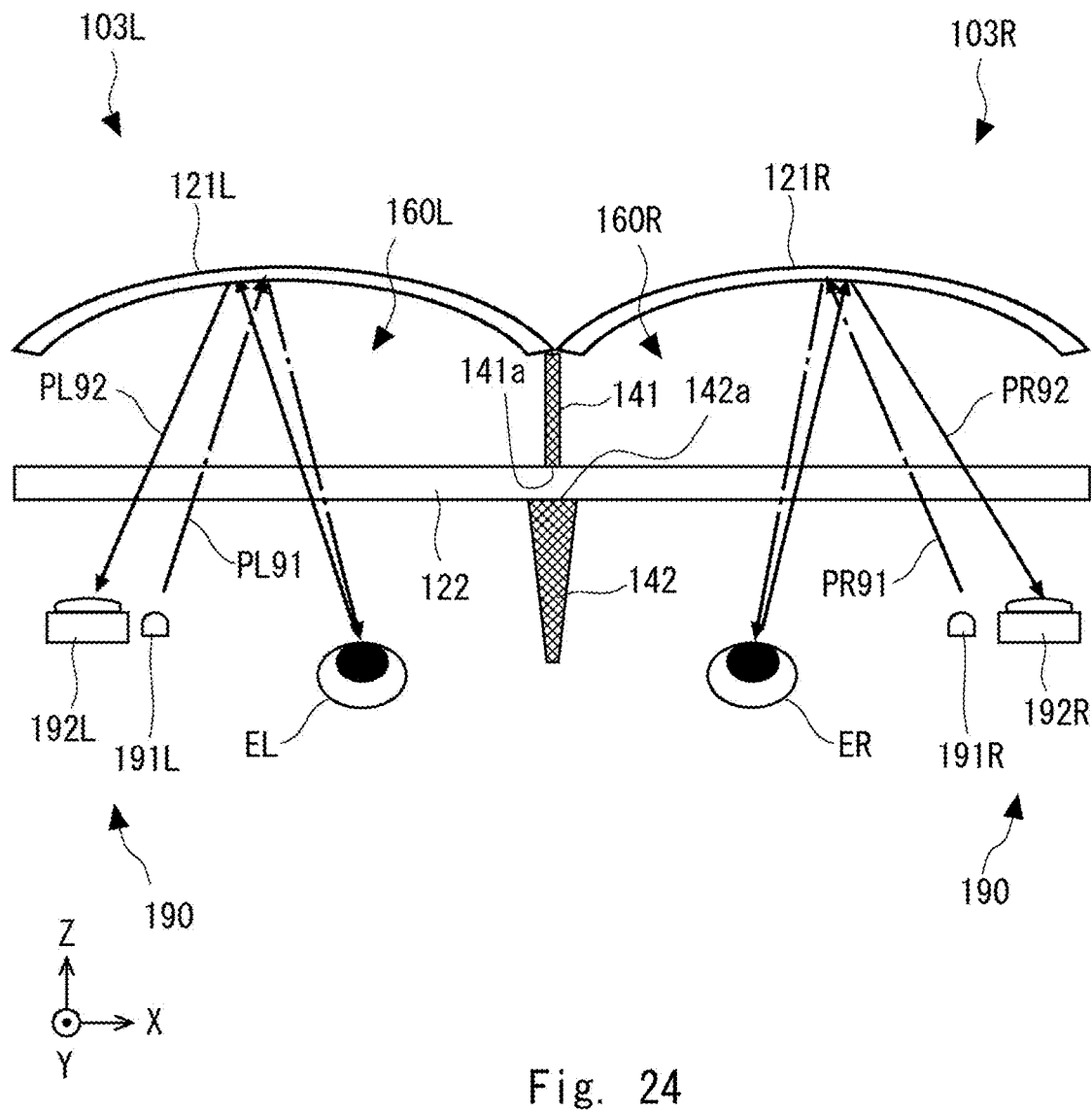
FIG. 24 is a top view schematically showing an example of arranging a light source and optical sensors for detecting a line of sight.

The line-of-sight detection unit 190 is arranged on the inner side of both the eyes in FIGS. 21 to 23, for example, but may be arranged on the outer side of both the eyes as shown in FIG. 24. In other words, the light source 191L and the optical sensor 192L are arranged on the +X side of the left eye EL in FIGS. 21 to 23, while the light source 191L and the optical sensor 192L are arranged on the −X side of the left eye EL in FIG. 24. The light source 191R and the optical sensor 192R are arranged on the −X side of the right eye ER in FIGS. 21 to 23, while the light source 191R and the optical sensor 192R are arranged on the +X side of the right eye ER in FIG. 24.

In the structure in FIG. 24, the line-of-sight detection unit 190 may be installed on a portion other than the divider plate 142. In FIG. 24, the light sources 191L, 191R and the optical sensors 192L, 192R may be fixed to the frame 102 (omitted in FIG. 24) or the like. Alternatively, the light sources 191L, 191R and the optical sensors 192L, 192R may be installed on the beam splitter 122. In this case, the light sources 191L, 191R and the optical sensors 192L, 192R are hidden from the user by the mask member 143 or the like. Note that although the divider plate 142 having the shape shown in FIG. 7 is provided in FIG. 24, the shape of the divider plate 142 is not particularly limited.

The head-mounted display 100 according to the third embodiment includes the combiners 121L, 121R, the light sources 191L, 191R, and the optical sensors 192L, 192R. The light source 191L and the optical sensor 192L are arranged to face the combiner 121L. The light source 191R and the optical sensor 192R are arranged to face the combiner 121R.

Further, the optical sensors 192L and 192R are provided for the divider plate 142 in FIGS. 21 to 23, but may be installed on a portion other than the divider plate 142. The optical sensors 192L and 192R are provided at positions where the reflected light PL92 and PR92 from the left eye EL and the right eye ER are detected respectively. For example, the optical sensors 192L and 192R can be installed on the frame 102 (see FIG. 16) or the like.

Note that in the third embodiment and its modified examples, it is also preferable to provide the divider plates 141 and 142. The divider plates 141 and 142 prevent the infrared light PL91, PR91 from the light sources 191L, 191R from being reflected on the other eye. For example, in a case where the divider plates 141 and 142 are not provided, the infrared light PL91 from the light source 191L is reflected by the right eye ER. The infrared light PL91 that has been reflected by the right eye ER is detected by the optical sensor 192R. Likewise, in the case where the divider plates 141 and 142 are not provided, the infrared light PR91 from the light source 191R is reflected by the left eye EL, and detected by the optical sensor 192L. In such a case, the detection accuracy of line-of-sight detection degrades, or line-of-sight detection cannot be performed. Therefore, the divider plate 141 and the divider plate 142 are provided to perform line-of-sight detection properly.

Note that although the head-mounted display 100 is described as an optical see-through head-mounted display, the head-mounted display 100 may be a non-transmissive head-mounted display. In the case of a non-transmissive head-mounted display, reflective mirrors are provided instead of the combiners 121L and 121R. In other words, a reflective member arranged in front of the beam splitter 122 may be a beam splitter such as a half mirror, or may be a reflective mirror. The reflective member reflects display light toward the user. Further, the structures of the first to third embodiments may be used in combination as appropriate.

Although the embodiments of the invention made by the present inventors are described in the foregoing, the present invention is not restricted to the above-described embodiments, and various changes and modifications may be made without departing from the scope of the invention.

The present disclosure is applicable to a head-mounted display.

What is claimed is:

1. A head-mounted display comprising:
    a reflective member arranged in front of a user, and configured to reflect display light for forming a display image toward the user;
    a beam splitter arranged between the reflective member and the user across a space in front of a left eye of the user and a space in front of a right eye, and configured to reflect the display light to the reflective member and transmit the display light that has been reflected by the reflective member;
    a first divider plate arranged in front of the beam splitter between the space in front of the left eye and the space in front of the right eye; and
    a second divider plate arranged behind the beam splitter between the space in front of the left eye and the space in front of the right eye,
    wherein an end of the first divider plate proximate to the beam splitter is hidden from the user by an opaque member provided between the left eye or the right eye and the end.

2. The head-mounted display according to claim 1, wherein the first divider plate is entirely hidden from the user.

3. The head-mounted display according to claim 1, wherein in the second divider plate, a thickness in a left-right direction of an end of the second divider plate proximate to the beam splitter is greater than a thickness of the end of the first divider plate proximate to the beam splitter.

4. The head-mounted display according to claim 3, wherein the second divider plate has a tapered shape that is gradually made thicker forward.

5. The head-mounted display according to claim 3, wherein the second divider plate has a tapered shape that is gradually made thinner forward.

6. The head-mounted display according to claim 3, wherein the second divider plate has a constant thickness.

7. The head-mounted display according to claim 1, further comprising a mask member arranged between the left eye or the right eye and the first divider plate.

8. The head-mounted display according to claim 7, wherein the mask member is provided on a surface of the beam splitter proximate to the second divider plate.

9. The head-mounted display according to claim 1, wherein the reflective member is a combiner configured to combine the display light and outside light from a front side of the user.

10. The head-mounted display according to claim 1, wherein the first and second divider plates are diffuse reflection plates.

11. The head-mounted display according to claim 10, wherein diffuse reflectance of the second divider plate is higher than diffuse reflectance of the first divider plate.

12. The head-mounted display according to claim 1, wherein a light source and an optical sensor configured to detect a line of sight are provided.

13. The head-mounted display according to claim 12, wherein the second divider plate is provided with the light source.

* * * * *